(12) United States Patent
Xu et al.

(10) Patent No.: US 8,131,659 B2
(45) Date of Patent: Mar. 6, 2012

(54) FIELD-PROGRAMMABLE GATE ARRAY BASED ACCELERATOR SYSTEM

(75) Inventors: Ning-Yi Xu, Beijing (CN); Xiong-Fei Cai, Beijing (CN); Rui Gao, Beijing (CN); Jing Yan, Beijing (CN); Feng-Hsiung Hsu, Cupertino, CA (US)

(73) Assignee: Microsoft Corporation, Redmond, WA (US)

( * ) Notice: Subject to any disclaimer, the term of this patent is extended or adjusted under 35 U.S.C. 154(b) by 750 days.

(21) Appl. No.: 12/238,239

(22) Filed: Sep. 25, 2008

(65) Prior Publication Data

US 2010/0076915 A1    Mar. 25, 2010

(51) Int. Cl.
*G06Q 30/00* (2012.01)
(52) U.S. Cl. ........................................... 706/15
(58) Field of Classification Search ............ 706/12, 706/45, 62, 15
See application file for complete search history.

(56) References Cited

U.S. PATENT DOCUMENTS

| | | |
|---|---|---|
| 5,320,538 A | 6/1994 | Baum |
| 5,423,554 A | 6/1995 | Davis |
| 5,432,895 A | 7/1995 | Myers |
| 5,490,784 A | 2/1996 | Carmein |
| 5,577,981 A | 11/1996 | Jarvik |
| 5,712,922 A | 1/1998 | Loewenthal et al. |
| 5,883,628 A | 3/1999 | Mullaly et al. |
| 5,892,961 A | 4/1999 | Trimberger |
| 5,892,962 A | 4/1999 | Cloutier |
| 5,913,727 A | 6/1999 | Ahdoot |
| 6,011,407 A | 1/2000 | New |
| 6,037,914 A | 3/2000 | Robinson |
| 6,064,749 A | 5/2000 | Hirota et al. |
| 6,084,979 A | 7/2000 | Kanade et al. |
| 6,102,832 A | 8/2000 | Tani |
| 6,122,627 A | 9/2000 | Carey et al. |
| 6,134,540 A | 10/2000 | Carey et al. |
| 6,141,034 A | 10/2000 | McCutchen |
| 6,199,008 B1 | 3/2001 | Aratow et al. |
| 6,222,757 B1 | 4/2001 | Rau et al. |

(Continued)

FOREIGN PATENT DOCUMENTS

EP    1170868 A1    1/2002

OTHER PUBLICATIONS

Cloutier et al., VIP: An FPGA-Based Processor for Image Processing and Neural Networks, 1996, IEEE Proceedings of MicroNeura, pp. 330-336.*

(Continued)

*Primary Examiner* — David Vincent
(74) *Attorney, Agent, or Firm* — Lee & Hayes, PLLC

(57) ABSTRACT

Accelerator systems and methods are disclosed that utilize FPGA technology to achieve better parallelism and processing speed. A Field Programmable Gate Array (FPGA) is configured to have a hardware logic performing computations associated with a neural network training algorithm, especially a Web relevance ranking algorithm such as LambaRank. The training data is first processed and organized by a host computing device, and then streamed to the FPGA for direct access by the FPGA to perform high-bandwidth computation with increased training speed. Thus, large data sets such as that related to Web relevance ranking can be processed. The FPGA may include a processing element performing computations of a hidden layer of the neural network training algorithm. Parallel computing may be realized using a single instruction multiple data streams (SIMD) architecture with multiple arithmetic logic units in the FPGA.

19 Claims, 11 Drawing Sheets

U.S. PATENT DOCUMENTS

| | | | |
|---|---|---|---|
| 6,226,237 B1 | 5/2001 | Chan et al. | |
| 6,356,637 B1 | 3/2002 | Garnett | |
| 6,408,257 B1 | 6/2002 | Harrington et al. | |
| 6,477,527 B2 | 11/2002 | Carey et al. | |
| 6,567,834 B1 * | 5/2003 | Marshall et al. | 708/626 |
| 6,601,049 B1 | 7/2003 | Cooper | |
| 6,611,823 B1 | 8/2003 | Selmic et al. | |
| 6,662,470 B2 | 12/2003 | Ellis, III | |
| 6,751,600 B1 | 6/2004 | Wolin | |
| 6,945,869 B2 | 9/2005 | Kim et al. | |
| 6,951,515 B2 | 10/2005 | Ohshima et al. | |
| 6,999,083 B2 | 2/2006 | Wong et al. | |
| 7,001,272 B2 | 2/2006 | Yamashita et al. | |
| 7,024,033 B2 | 4/2006 | Li et al. | |
| 7,050,078 B2 | 5/2006 | Dempski | |
| 7,099,745 B2 | 8/2006 | Ebert | |
| 7,138,963 B2 | 11/2006 | Hobgood et al. | |
| 7,162,054 B2 | 1/2007 | Meisner et al. | |
| 7,197,497 B2 | 3/2007 | Cossock | |
| 7,318,051 B2 | 1/2008 | Weston et al. | |
| 7,369,869 B2 | 5/2008 | Wiatrowski et al. | |
| 7,398,093 B2 | 7/2008 | Hull et al. | |
| 7,446,772 B2 | 11/2008 | Wong et al. | |
| 7,526,101 B2 | 4/2009 | Avidan | |
| 7,660,793 B2 * | 2/2010 | Indeck et al. | 707/999.005 |
| 7,707,163 B2 | 4/2010 | Anzalone et al. | |
| 7,805,438 B2 | 9/2010 | Liu et al. | |
| 7,840,482 B2 * | 11/2010 | Singla et al. | 705/37 |
| 7,844,085 B2 | 11/2010 | Lu et al. | |
| 2002/0010734 A1 | 1/2002 | Ebersole et al. | |
| 2002/0123977 A1 | 9/2002 | Raz | |
| 2002/0167536 A1 | 11/2002 | Valdes et al. | |
| 2003/0002731 A1 | 1/2003 | Wersing et al. | |
| 2004/0111388 A1 | 6/2004 | Boiscuvier et al. | |
| 2004/0136471 A1 | 7/2004 | Pao et al. | |
| 2004/0193441 A1 | 9/2004 | Altieri | |
| 2004/0225483 A1 | 11/2004 | Okoniewski et al. | |
| 2005/0049913 A1 | 3/2005 | Huddleston et al. | |
| 2005/0144149 A1 | 6/2005 | Li et al. | |
| 2005/0234953 A1 | 10/2005 | Zhang et al. | |
| 2005/0246328 A1 | 11/2005 | Zhang et al. | |
| 2005/0280661 A1 | 12/2005 | Kobayashi et al. | |
| 2006/0013473 A1 | 1/2006 | Woodfill et al. | |
| 2006/0038833 A1 | 2/2006 | Mallinson et al. | |
| 2006/0047704 A1 | 3/2006 | Gopalakrishnan | |
| 2006/0105838 A1 | 5/2006 | Mullen | |
| 2006/0110028 A1 | 5/2006 | Liu et al. | |
| 2006/0126740 A1 | 6/2006 | Lin et al. | |
| 2006/0136411 A1 | 6/2006 | Meyerzon et al. | |
| 2006/0149883 A1 | 7/2006 | Benbow et al. | |
| 2006/0224532 A1 | 10/2006 | Duan et al. | |
| 2006/0262140 A1 | 11/2006 | Kujawa et al. | |
| 2006/0294059 A1 | 12/2006 | Chamberlain et al. | |
| 2007/0022063 A1 * | 1/2007 | Lightowler | 706/15 |
| 2007/0035562 A1 | 2/2007 | Azuma et al. | |
| 2007/0038944 A1 | 2/2007 | Carignano et al. | |
| 2007/0073749 A1 | 3/2007 | Fan | |
| 2007/0110298 A1 | 5/2007 | Graepel et al. | |
| 2007/0132785 A1 | 6/2007 | Ebersole, Jr. et al. | |
| 2007/0162448 A1 | 7/2007 | Jain et al. | |
| 2007/0233679 A1 | 10/2007 | Liu et al. | |
| 2007/0244884 A1 | 10/2007 | Yang | |
| 2008/0004865 A1 | 1/2008 | Weng et al. | |
| 2008/0018668 A1 | 1/2008 | Yamauchi | |
| 2008/0027912 A1 | 1/2008 | Liu et al. | |
| 2008/0027925 A1 | 1/2008 | Li et al. | |
| 2008/0033939 A1 | 2/2008 | Khandelwal | |
| 2008/0060034 A1 | 3/2008 | Egnal et al. | |
| 2008/0097938 A1 | 4/2008 | Guyon et al. | |
| 2008/0126275 A1 | 5/2008 | Crnojevic et al. | |
| 2008/0140589 A1 | 6/2008 | Basu et al. | |
| 2008/0150963 A1 | 6/2008 | Stambaugh | |
| 2008/0262984 A1 | 10/2008 | Xu et al. | |
| 2009/0031104 A1 * | 1/2009 | Vorbach et al. | 712/18 |
| 2009/0157571 A1 | 6/2009 | Smith et al. | |
| 2009/0240680 A1 * | 9/2009 | Tankovich et al. | 707/5 |
| 2009/0265290 A1 | 10/2009 | Ciaramita et al. | |
| 2009/0287620 A1 | 11/2009 | Xu | |
| 2009/0287621 A1 | 11/2009 | Krupka et al. | |

OTHER PUBLICATIONS

Yang et al., Implementation of an RBF Neural Network on Embedded Systems: Real-Time Face Tracking and Identity Verifacation, 2003, IEEE, pp. 1162-1175.*

McGettrick et al., Searching the Web with an FPGA Based Search Engine, 2007, Springer-Verlag Heidelberg, pp. 350-357.*

Yue et al., On Using Simultaneous Perturbation Stochastic Approximation for IR Measures, and the Empirical Optimality of LamdaRank, 2007,NIPS Machine Learning for We Search Workshop, pp. 1-8.*

Li et al., Learning to Rank Using Classification and Gradient Boosting, 2007, NIPS, pp. 1-10.*

Agarwal et al., Proceedings of the NIPS 2005 Workshop on Learning to Rank, 2005, NIPS pp. 1-44.*

Billinghurst et al., "Collaborative Mixed Reality", In Proceedings of the 1st Intl Symposium on Mixed Reality (ISMR 99), Japan, Mar. 1999, 16 pgs.

Fischer, et al., "Stylized Augmented Reality for Improved Immersion". <<http://www.gris.uni-tuebingen.de/people/staff/bartz/Publications/paper/vr2005.pdf>> Last accessed on Aug. 17, 2007.

Julier, et al., "Information Filtering for Mobile Augmented Reality". Jul. 2, 2002. <<http://www.ait.nrl.navy.mil/3dvmel/papers/j_IEEECGA02.pdf>>.

McElligott et al., "ForSe FIElds—Force Sensors for Interactive Environments", Lecture Notes in Computer Science, UbiComp 2002: Ubiquitous Computing, 4th Intl Conf, Sweden Sep. 2002, vol. 2498, 8 pgs.

Muir, "Virtual Reality vs Composite Reality" Blog, retrieved on Jun. 6, 2007, at http://citrite.org/blogs/jeffreymuir/2007/02/22/virtual-reality-vs-composite-reality/, Feb. 22, 2007, 3 pages.

Piekarski et al., "ARQuake: The Outdoor Augmented Reality Gaming System", Communications of the ACM, vol. 45, No. 1, Jan. 2002, pp. 36-38.

Rose et al., "Annotating Real-World Objects Using Augmented Reality", Computer Graphics: Developments in Virtual Environments (Proc. CG Intl 95 Conf), Jun. 1995, 21 pgs.

Sestito, et al., "Intelligent Filtering for Augmented Reality". <<www.siaa.asn.,au/get/2395365383.pdf>> Last accessed on Aug. 17, 2007.

Simsarian et al., "Windows on the World: An Example of Augmented Virtuality", retrieved on Jun. 6, 2007 and found at http://www.sics.se/~kalle/published/wow.pdf, 7 pages.

Teitel, "The Eyephone: A Head-Mounted Stereo Display", Abstract, Proceedings of SPIE, Sep. 1990, Stereoscopic Displays and Applications, vol. 1256, 2 pgs.

Wikipedia, "Augmented Virtuality", retrieved on Jun. 6, 2007, at http://en.wikipedia.org/wiki/Augmented_virtuality, 1 pg.

Wikipedia, "EyeToy", retrieved on Jun. 6, 2007, found at http://en.wikipedia.org/wiki/EyeToy, 5 pages.

Aryashev, et al., "Parallel FPGA Processor Card for Distributed Information Processing", retrieved on Mar. 7, 2007, at <<http://www.niisi.ru/old/pap_for.htm>>, pp. 1-11.

Burges, et al, "Learning to Rank with Nonsmooth Cost Functions", retrieved at <<http://research.microsoft.com/~cburges/papers/lambdarank.pdf>>, 2006, Microsoft, pp. 1-8.

Farber, et al, "Parallel Neural Network Training on Multi-Spert", retrieved at <<http://ieeexplore.ieee.org/iel4/5245/14210/00651531.pdf?tp=&isnumber=14210&arnumber=651531>>, IEEE, 1997, pp. 659-666.

"Fpga-Press-3x: Data/ Image compression PCI—Board", available at least as early as Mar. 6, 2007, at <<www.gemac-chemnitz.de/all_pdf_files/fpga-board-flyer.pdf>>, pp. 1-2.

Huang, et al, "Improving the Back Propagation Learning Speed with Adaptive Neuro-Fuzzy Technique", retrieved at <<http://ieeexplore.ieee.org/iel4/5797/15470/00714328.pdf?tp=&isnumber=15470&arnumber=714328>>, IEEE, 1993, pp. 2897-2900.

Joachims, "Optimizing Search Engines Using Clickthrough Data," retrieved at http://www.cs.cornell.edu/People/tj/publications/joachims_02c.pdf, SIGKDD 02, Edmonton, Alberta, Canada, 2002, 10 pgs.

Lemoine, et al., "Run Time Reconfiguration of FPGA for Scanning Genomic DataBases", retrieved on Mar. 7, 2007, at <<doi.ieeecomputersociety.org/10.1109/FPGA.1995.477414>>, IEEE, 1995, pp. 1-2.

Li, et al, "Learning to Rank Using Classification and Gradient Boosting", retrieved at <<http://research.microsoft.com/~cburges/papers/BoostTreeRank.pdf>>, Microsoft, 2007, pp. 1-10.

Littlefield, "Board vendor FPGA toolkits make or break your project", available at least as early as Mar. 6, 2007, at <<www.cwcembedded.com/documents/contentdocuments/Article-MES-August-2006.pdf>>, Military Embedded Systems, 2006, pp. 1-4.

Melnik et al, "Concave Learners for Rankboost," retreived at <<http://jmlr.csail.mit.edu/papers/volume8/melnik07a/melnik07a.pdf, Journal of Machine Learning Research, Apr. 25, 2007, pp. 791-812.

Raykar, et al, "A Fast Algorithm for Learning a Ranking Function from Large Scale Data Sets", retrieved at <<http://www.umiacs.umd.edu/users/vikas/publications/raykar_PAMI_2007.pdf>>, IEEE, Aug. 22, 2007, pp. 0-29.

Torresen, et al, "A Review of Parallel Implementations of Backpropagation Neural Networks", retrieved at <<http://ifi.uio.no/~jimtoer/chp2.ps>>, Chapter 2 in the book by N. Sundararajan and P. Saratchandran (editors): Parallel Architectures for Artificial Neural Networks, IEEE CS Press, 1998, pp. 41-118.

Usunier et al, "Boosting Weak Ranking Functions to Enhance Passage Retrieval for Question Answering," retrieved at http://eprints.pascal-network.org/archive/00000428/02/BosWRF2EPR_IR4QA04.pdf>>, SIGIR 2004, Jul. 25-29, 2004, Sheffield, England, 6 pgs.

Xu et al, "FPGA-based Accelerator Design for RankBoost in Web Search Engines," retrieved at <<http://www.doc.ic.ac.uk/~wl/teachlocal/cuscomp/papers/fpt07nx.pdf>>, IEEE, 2007, 8 pgs.

De Fuentes, "A Parallel Programming Model for a Multi-FPGA Multiprocessor Machine", Thesis, University of Toronto, 2006, pp. 1-89.

Dillinger et al., "FPGA Based Real-Time Image Segmentation for Medical Systems and Data Processing", IEEE, 2005, pp. 161-165.

Eick et al., "Hardware Accelerated Algorithms for Semantic Processing of Document Streams", IEEE Aerospace Conference, Big Sky, MT, Mar. 4-11, 2006, pp. 1-14.

McGettrick et al., "Searching the Web with an FPGA based Search Engine", ARC 2007, LNCS 4419, pp. 350-357.

Xilinx, Virtex-II Pro FPGAs: The Highest System Performance; The Lowest System Cost, Product Brochure, 2004, pp. 1-2.

Non-Final Office Action for U.S. Appl. No. 12/238,012, mailed on Aug. 30, 2011, Ning-Yi Xu, "Automated Feature Selection Based on Rankboost for Ranking", 17 pages.

Akesson et al., "Augmented Virtuality: A Method to Automatically Augment Virtual Worlds with Video Images", Abstract, Preface and Table of Contents for Master Thesis at Swedish Institute of Computer Science, Nov. 1997, full text found at http://www.sics.se/~kalle/projects/Master_Thesis/Index.html., 5 pgs.

Cuenca et al., "Reconfigurable Frame-Grabber for Real-Time Automated Visual inspection (RT-AVI) Systems", FPL2001, LNCS 2147, 2001, pp. 223-231.

Ghoting et al., "A Characterization of Data Mining Algotiyhms on a Modern Processor", Proceeding of the First International Workshop on Data Management on New Hardware (DaMon 2005), Jun. 12, 2005, Baltimore MD, pp. 1-6.

Mutlu et al., "Address-Value Delta (AVD) Prediction: A Hardware Technique for Efficiently Parallelizing Depending Cache Misses", IEEE Transactions on Computers, vol. 55, No. 12., 2006, pp. 1491-1508.

Nair et al., "An FPGA-Based People Detection System", EURASIP Journal on Applied Signal Processing 2005:7, pp. 1047-1061.

Final Office Action for U.S. Appl. No. 11/737,605, mailed on Jun. 9, 2011, "Field-Programmable Gate Array Based Accelerator System".

Vu et al., "Using RankBoost to Compare Retrieval Systems", CIKM 2005, Proceeding of the 14th ACM International Conference in Information and Knowledge Management, 2005, pp. 309-310.

* cited by examiner

300

700

| Byte3 | Byte2 | Byte1 | Byte0 | Byte3 | Byte2 | Byte1 | Byte0 | |
|---|---|---|---|---|---|---|---|---|
| colspan=4 x00000000 | | | | colspan=2 PairsNum | | colspan=2 DocNum | | Query 0 |
| Indexi(H) | Indexj(L) | Indexi(H) | Indexj(L) | Indexi(H) | Indexj(L) | Indexi(H) | Indexj(L) | Pairs |
| x00 | x00 | x00 | x00 | x00 | x00 | Indexi(H) | Indexj(L) | Index |
| colspan=4 (GainHi-GainLj)/max(DCG) | | | | colspan=4 (GainHi-GainLj)/max(DCG) | | | | Gain |
| colspan=4 (GainHi-GainLj)/max(DCG) | | | | colspan=4 (GainHi-GainLj)/max(DCG) | | | | Normalize |
| colspan=4 x00000000 | | | | colspan=4 (GainHi-GainLj)/max(DCG) | | | | |
| colspan=4 Doc 1: Feature 0 (float) | | | | colspan=4 Doc 0: Feature 0 (float) | | | | |
| colspan=4 Doc 1: Feature 1 (float) | | | | colspan=4 Doc 0: Feature 1 (float) | | | | |
| colspan=4 Doc 1: Feature 2 (float) | | | | colspan=4 Doc 0: Feature 2 (float) | | | | |
| colspan=4 Doc 1: Feature 3 (float) | | | | colspan=4 Doc 0: Feature 3 (float) | | | | |
| colspan=4 Doc 3: Feature 0 (float) | | | | colspan=4 Doc 2: Feature 0 (float) | | | | |
| colspan=4 Doc 3: Feature 1 (float) | | | | colspan=4 Doc 2: Feature 1 (float) | | | | |
| colspan=4 Doc 3: Feature 2 (float) | | | | colspan=4 Doc 2: Feature 2 (float) | | | | |
| colspan=4 Doc 3: Feature 3 (float) | | | | colspan=4 Doc 2: Feature 3 (float) | | | | |
| colspan=4 default | | | | colspan=2 PairsNum | | colspan=2 DocNum(3) | | Query 1 |
| Indexi(H) | Indexj(L) | Indexi(H) | Indexj(L) | Indexi(H) | Indexj(L) | Indexi(H) | Indexj(L) | Pairs Index |
| colspan=4 (GainHi-GainLj)/max(DCG) | | | | colspan=4 (GainHi-GainLj)/max(DCG) | | | | Gain |
| colspan=4 (GainHi-GainLj)/max(DCG) | | | | colspan=4 (GainHi-GainLj)/max(DCG) | | | | Normalize |
| colspan=4 Doc 1: Feature 0 (float) | | | | colspan=4 Doc 0: Feature 0 (float) | | | | |
| colspan=4 Doc 1: Feature 1 (float) | | | | colspan=4 Doc 0: Feature 1 (float) | | | | |
| colspan=4 Doc 1: Feature 2 (float) | | | | colspan=4 Doc 0: Feature 2 (float) | | | | |
| colspan=4 Doc 1: Feature 3 (float) | | | | colspan=4 Doc 0: Feature 3 (float) | | | | |
| colspan=4 x00000000 | | | | colspan=4 Doc 2: Feature 0 (float) | | | | |
| colspan=4 x00000000 | | | | colspan=4 Doc 2: Feature 1 (float) | | | | |
| colspan=4 x00000000 | | | | colspan=4 Doc 2: Feature 2 (float) | | | | |
| colspan=4 x00000000 | | | | colspan=4 Doc 2: Feature 3 (float) | | | | |

FIG. 7

FIELD-PROGRAMMABLE GATE ARRAY BASED ACCELERATOR SYSTEM

RELATED APPLICATIONS

This application is related to U.S. patent application Ser. No. 11/737,605 entitled "FIELD-PROGRAMMABLE GATE ARRAY BASED ACCELERATOR SYSTEM", filed on Apr. 19, 2007, which application is hereby incorporated by reference in its entirety.

BACKGROUND

In information retrieval, ranking is of central importance. Good ranking is the basis for relevance, while the relevance is the basis for Web search to attract users and advertisers. Ranking is usually done by applying a ranking function (a ranker) onto a set of objects (e.g., documents) to compute a score for each object and sort the objects according to the scores. Depending on applications the scores may represent the degrees of relevance, preference, or importance, but relevance is usually referred to without losing generality.

Information retrieval (IR) researchers have studied search relevance for various search engines and tools. Representative methods include Boolean, vector space, probabilistic, and language models. Earlier search engines and tools were mainly based on such IR algorithms. These search engines and tools incorporate in varying degrees the concept of the ranking function. Many factors may affect the ranking function for search relevance. These factors may include page content, title, anchor, URL, spam, and page freshness. It is extremely difficult to manually tune ranking function parameters to accommodate these factors for large-scale data sets, such as those that are common in many applications including World Wide Web ("Web") applications and speech and image processing. For these large data sets, machine based learning algorithms have been applied to learn complex ranking functions from large-scale data sets.

Early algorithms for ranking function learning include Polynomial-based regression, Genetic Programming, RankSVM and classification-based SVM. However, these algorithms were only evaluated on a small-scale dataset due to the high computational cost. In fact, these traditional machine-learning algorithms operate slowly when searching large-scale data sets. Users often wait many hours, days, or even weeks to get results from these data sets.

More recently, Neural Network (NN) started to be intensively used in many application areas (such as pattern recognition, signal processing, time series analysis, etc.) due to its superior quality. For example, Microsoft's MSN has used RankNet and is now using LambdaRank, to produce a NN model to generate ranking models for web pages in the Live Search engine. In Web Search ranking, the scale of data sets is large, so the training process may cost a lot of time and huge human effort on general purpose computers. This leads to low relevance quality and large cost for the search engines.

This slow computation time may be due, in part, to a typical personal computer (PC) being unable to exploit full parallelism in machine-learning algorithms efficiently. Instruction level parallelism techniques somewhat improve the processing time. More particularly, distributed implementations with process level parallelism are faster than many of the PC central processing units (CPUs), which execute instructions in sequential manner. However, distributed implementations occupy many machines and are very hardware intensive. Additionally, for some algorithms, distributed computing yields poor speed improvement per processor added due to communication cost. A Graphics Processing Unit (GPU)-based accelerator is another potential solution, but it could only accelerate a limited spectrum of machine learning algorithms due to its special hardware structure optimized for graphics applications. Memory access bandwidth, communication cost, flexibility and granularity of parallelism remain bottlenecks for these solutions. Furthermore, despite their generally recognized performances, the high cost of developing ASICs (Application Specific Integrated Circuits) has hampered such hardware neural network computing devices from seeing significant applications.

SUMMARY

Disclosed are accelerator systems and methods that utilize FPGA technology to achieve better parallelism and processing speed. An FPGA-based accelerator has a Field Programmable Gate Array (FPGA) configured to have a hardware logic performing computations associated with a neural network training algorithm, especially a web relevance ranking algorithm such as LambaRank. The training data is first processed and organized by a host computing device, and then streamed to the FPGA for direct access by the FPGA in order to perform high-bandwidth computation with increased training speed. Thus, large data sets such as that related to web relevance ranking can be processed. The FPGA may include a processing element performing computations of a hidden layer of the neural network training algorithm. Parallel computing may be realized using a single instruction multiple data streams (SIMD) architecture with multiple arithmetic logic units in the FPGA.

In one embodiment, the hardware logic of the FPGA includes a processing element performing computations relating to a hidden layer of the neural network training algorithm. The processing element may have a plurality of arithmetic logic units each representing a hidden node of the hidden layer. Each arithmetic logic unit may include a plurality of multiple-pipeline multipliers and a plurality of multiple-pipeline adders. The multipliers and the adders can be based on floating-point numbers to improve weight precision. The plurality of arithmetic logic units performs parallel computations.

In one embodiment, the FPGA-based accelerator uses a PCI controller to communicate with a host CPU. The FPGA-based accelerator may also include DDR memory provided on the same PCI board with the FPGA.

According to another exemplary implementation, a neural network system includes a host computing device for storing and processing training data, a Field Programmable Gate Array (FPGA) provided on a substrate, and an interface for connecting the FPGA to the host computing device. The FPGA is configured to have a hardware logic performing computations associated with a neural network training algorithm by receiving streamed data directly from the host computer device.

Another aspect of the present disclosure is a method for neural network training. The method stores and processes training data on a host computing device; streams the processed training data to a Field Programmable Gate Array (FPGA) configured to have a hardware logic performing computations associated with a neural network training algorithm; and enables the FPGA to perform neural network training with respect to the streamed training data.

By virtue of the method and system disclosed herein, a user can train a ranking model with much less time and cost, making it possible to attempt different learning parameters of the algorithm in the same time, or carry out a study that depends on numerous ranking models.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE FIGURES

The detailed description is described with reference to the accompanying figures. In the figures, the left-most digit(s) of a reference number identifies the figure in which the reference number first appears. The use of the same reference numbers in different figures indicates similar or identical items.

FIG. 7 shows an exemplary data format used for data streaming from a host computer to an FPGA.

DETAILED DESCRIPTION

Overview

Figure 1:
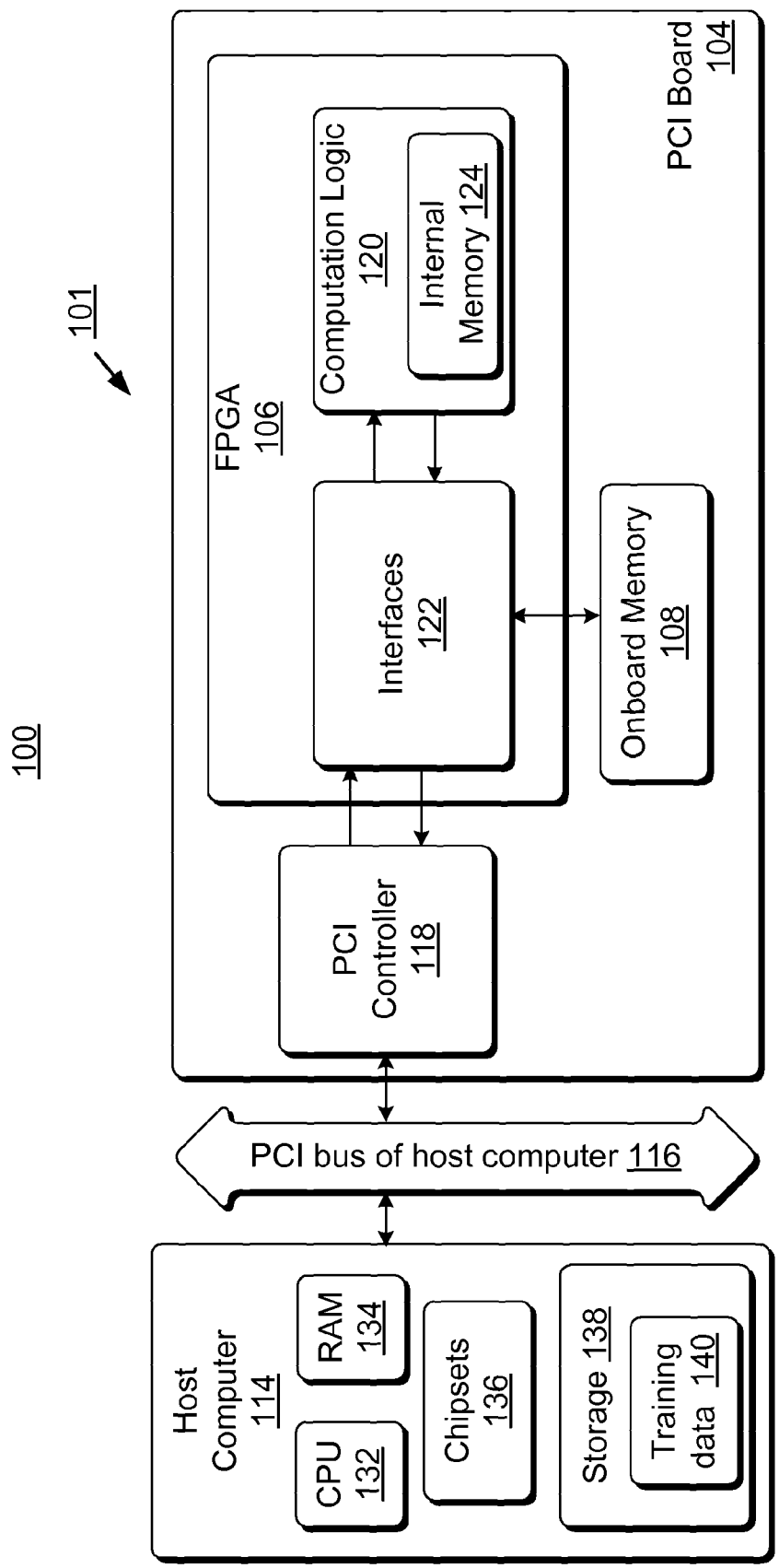
FIG. 1 shows an exemplary architecture of an FPGA-based accelerator system for machine learning (training) in accordance with the present disclosure.

An FPGA-based accelerator system for machine learning as described and claimed herein accelerates selected algorithms by providing better processing parallelism and memory access. The disclosed design takes advantage of the appearance of large, dense, highly parallel FPGA circuits with customizable hardware structure to realize large-scale neural networks in hardware, with the flexibility and low cost of software implementations.

One aspect of the present disclosure is a neural network system that has a Field Programmable Gate Array (FPGA) configured to have a hardware logic performing computations associated with a neural network training algorithm by receiving streamed data directly from a host computer device. The neural network system also has an interface for connecting the FPGA to the host computing device and receiving the streamed data.

Another aspect of the present disclosure is a method for neural network training. The method stores and processes training data on a host computing device; streams the processed training data to a Field Programmable Gate Array (FPGA) configured to have a hardware logic performing computations associated with a neural network training algorithm; and enables the FPGA to perform neural network training with respect to the streamed training data.

In particular, the disclosed design makes it possible to handle neural networks that are used for Web ranking, such as RankNet and LambdaRank. The training and application of these neural network face special challenges compared to existing neural network FPGA implementations, as discussed below.

First, Web ranking tends to have very large training data. The Web scale data makes it difficult or impossible to load all training data to the accelerator board before training. To overcome this difficulty, the disclosed streaming architecture uses the host computer to prepare the training data in its main memory, and then send the data streams to the FPGA accelerator board in a streamed fashion, continuously and repetitively as needed. The hardware logic in the FPGA on the accelerator board cause direct real-time access to the streamed data in training the neural network model.

Second, newer neural networks such as LambdaRank have a query level cost function, which is much more complex than common Back-Propagate (BP) NN algorithm. To address this complexity, some embodiments of the disclosed FPGA accelerator are elaborately designed to accelerate such neural networks on the hardware level.

Third, in order to obtain a ranking model that can rank tens of thousands web pages, the model may need to have high precision weights. To achieve the necessary high precision weights, some embodiments of the disclosed FPGA accelerator implements single precision floating point numbers instead of using fixed point numbers to update the weights.

The disclosed FPGA-based neural networks and methods can be applied to the training of any neural network model, but is particularly suited for training back propagation neural networks, and especially for training back propagation neural networks that handle a large training data set, such as that in Web ranking.

Exemplary FPGA Implementation of Neural Network Training

The neural network training algorithm is implemented using FPGA. The implementation is at least partially hardware-based using customer-configured a field programmable gate array. A unique data streaming method is used between a host computing device and the FPGA board to enable training of a large data set.

One embodiment is an FPGA-based acceleration device, which may include a substrate, such as a Peripheral Component Interconnect (PCI) card, with a Field-Programmable Gate Array (FPGA) and memories acting as caches, e.g., SRAM, SDRAM, and so forth, connected to a computing device. The FPGA has multiple logic blocks which are programmed to function as processing elements (PEs), as will be illustrated below. The memories of FPGA may have a hierarchy including at least an onboard common memory shared by the multiple logic blocks, and internal memories embedded in or directly accessible by each logic blocks or processing elements (PEs). One or more neural network algorithms may be implemented on one or more of the FPGAs with direct parallel architecture and/or pipelined architecture to exploit both application parallelism and direct functional logic implementation. The PCI could be replaced by other computer buses, including but not limited to PCI-X, PCI-Express, HyperTransport, Universal Serial Bus (USB) and Front-Side Bus (FSB).

A training data set or other data is first stored and preprocessed by the computing device, and at least part of the training data is then streamed directly onto the internal memories of the PEs on the accelerator board, or onto embedded memories in the FPGA, to increase memory access bandwidth and data locality. The training data set may comprise information collected from Web searches to assess relevancy, and other characteristics. The system may include or be associated with one or more PCs or other computing devices, each computing device having one or more accelerator cards.

FIG. 1 shows an exemplary architecture of an FPGA-based accelerator system for machine learning (training) in accordance with the present disclosure. The accelerator system 100 may include an acceleration device 101 comprising a Peripheral Component Interface (PCI) board 104 with a Field-Programmable Gate Array (FPGA) 106 and onboard memory 108, which can be any suitable RAM (including SRAM and/or SDRAM) such as DDR, DDR2 or DDR3, and so forth, connected to a computing device such as a host computer 114. The PCI board 104 may interface with a PCI bus 116 on or associated with the host computing device 114. The PCI board 104, and/or devices thereon, may communicate with the bus 116 thorough a PCI controller 118.

The FPGA 106 may comprise a computation logic 120 that communicates to the onboard memory 108 and/or the PCI controller 118 through one or more interfaces 122. The computation logic 120 has direct access to an internal memory 124, which can be an embedded RAM such as a dual port RAM. As will be shown further below, the computation logic 120 can be programmed or configured into multiple logic blocks to realize the functions of multiple processing elements (PEs).

The host computer 114 has a CPU 132, host memory RAM 134, chipsets 136, and a host storage (such as a hard disk) 138. Training data 140 or other data are stored in the host storage 138 and processed when necessary by the host computer 114. At least part of the training data 140 are streamed directly to the embedded memory 124 of the computation logic 120 in the FPGA 106, in order to increase memory access bandwidth and data locality. Software loaded on the computer 114 may be capable of programming or re-programming the FPGA 106 at any time during processing.

The FPGA-based accelerator may be used for generating ranking models for Web Search engines using a neural network training program, such as RankNet or LambaRank. This task is an iterative task in the search relevance ranking engineering pipeline. The ranking models need to update regularly (e.g. weekly) to reflect the dynamics of the Web on different markets characterized by languages and regions.

An exemplary procedure to use the FPGA-based accelerator is as follows. (1) Plug the accelerator 101 to host computer 114 that has PCI Express slot. The accelerator 101 in one embodiment is a PCI Express add-in card; (2) Install the device driver and software into the host computer 114; (3) Receive and prepare the training data set, feature set description file, and set the proper training parameters on the host computer; and (4) Run the accelerator 101 to train the ranking model. If the training model is not satisfactory, return to step (3) and modify the training settings and parameters to explore the parameter space.

Multiple FPGA-based accelerators may be used in parallel in the same host computer, and further multiple host computers may be used together to further improve the performance.

Figure 2:
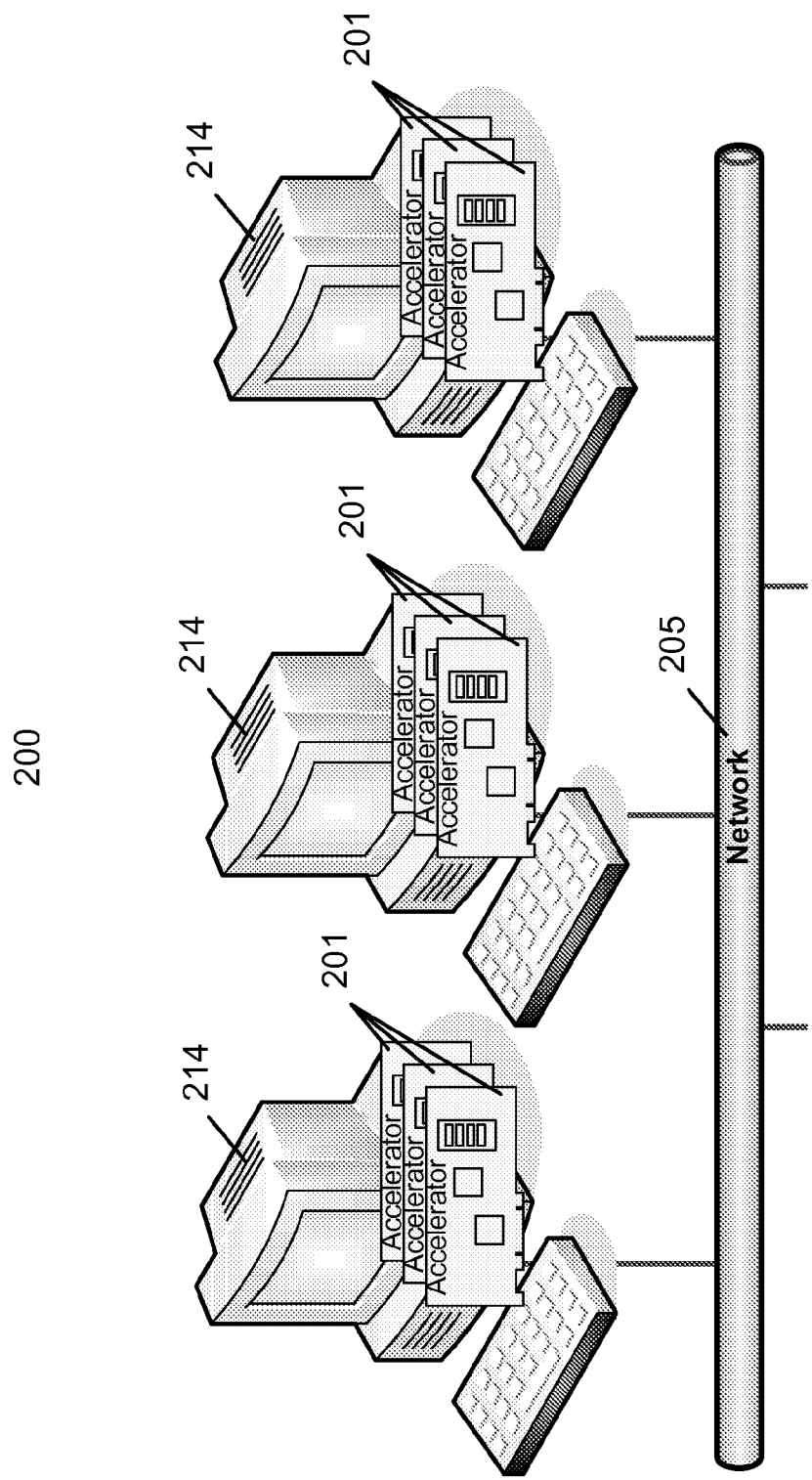
FIG. 2 shows an exemplary distributed deployment of the FPGA accelerator.

FIG. 2 shows an exemplary distributed deployment of the FPGA accelerator. As shown in FIG. 2, an acceleration system 200 may be composed of one or more computing devices 214, similar to computer 114, with each computing device 214 having one or more PCI cards 201, similar to PCI board 104. The computing devices 214 may be connected through a network 205. Thus, multiple cards 201 on multiple computing devices 214 may process data in parallel and thereby handle larger scale algorithms.

Machine Learning and Neural Network Training

The disclosed FPGA architecture could be used to accelerate a class of machine learning algorithms, particularly neural network training algorithms. Specific implementation of a neural network training algorithm is related to the process and computation involved in the actual algorithm. In the following, a generic back propagation neural network is illustrated, followed by a description of two exemplary classes of neural network algorithms that can be implemented with the disclosed FPGA architecture, namely pair-wise and query-wise neural network algorithms. Thereafter, an illustration of a more elaborate LambaRank algorithm is provided. It is appreciated that because the disclosed accelerator is based-on reconfigurable hardware FPGA, it can be reconfigured to adapt to a broader class of algorithms besides the algorithm described here.

Figure 3:
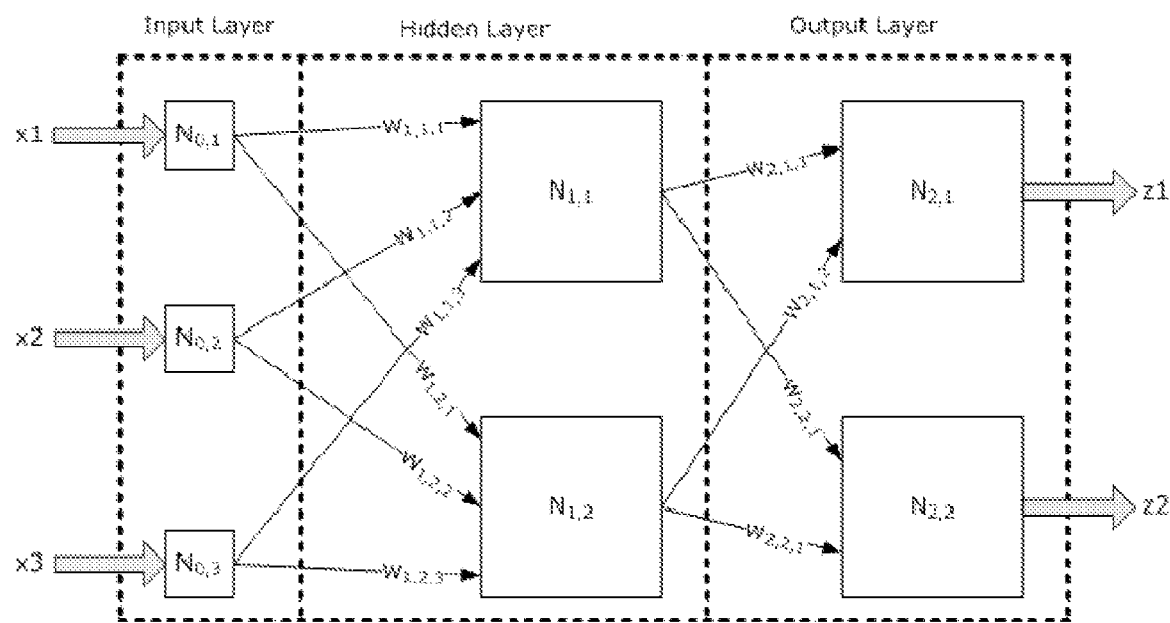
FIG. 3 shows an exemplary back propagation neural network.

FIG. 3 is a block diagram showing an exemplary back propagation neural network. The illustrated neural network 300 has three layers (but is conventionally referred to as a 2-layer NN, not counting the input layer), including an input layer with three neurons, a hidden layer with two neurons; and an output layer with two neurons. A back propagation neural network must have at least an input layer and an output layer, but it could have zero or more hidden layers.

The output of the neural network 300 is obtained by applying input values to the input layer, passing the output of each neuron to the following layer as input. At each neuron $N_i$, an output may be calculated as:

$$O_i = \Sigma_j x_j * w_j + \theta_i,$$

for j=1 to m (to include all neurons in the previous layer).

Typically, in a neural network, the output of a neuron in a layer goes to all neurons in the following layer. Each pair of connected neurons forms an edge which has its own input weight. The weights for the input layer can be assumed to be 1 for each input. In other words, input values at the input layer are taken at their face values and are not weighted (although the face values themselves may be scaled or normalized before being applied as the input at the input layer, depending on needs). For this reason, the nodes in the input layer are usually not considered to be neurons and do not require much consideration in implementing the associated calculations. Accordingly, as will be seen herein, the main focus of the disclosed FPGA implementation is on the hidden layer and the output layer, especially the former.

The number of nodes in the input layer depends on the number of possible inputs, while the number of neurons in the output layer depends on the number of desired outputs. The number of hidden layers and the number of neurons in each hidden layer are usually not inherently defined by the number of inputs and outputs in advance, and could change per network configuration and type of data. This therefore becomes a point of design consideration. The embodiments illustrated in the present disclosure shows one hidden layer, and some embodiments have 10 or 20 hidden nodes in the hidden layer. But it is appreciated that from a mathematical solution point of view, there is no fundamental limitation to these choices of the hidden layer, and they are thus chosen according to the design preferences and hardware characteristics. In general, the addition of a hidden layer could allow the network to learn more complex patterns, but at the same time may decrease its performance. One could start a network configuration using a single hidden layer, and add more hidden layers if the network is not learning well.

The back propagation neural network works in two modes, a training mode and a production mode. The disclosed FPGA-based back propagation neural network is primarily for training. Once the neural network model is trained, it can be put into production (e.g., actual ranking) using any suitable implementation of the trained neural network model. In other words, the implementation of the trained neural network model does not have to be the same as the disclosed FPGA-based hardware/software implementation.

The training in the illustrated embodiments is supervised training. Such training is based on a training data set that includes ground-truth rating information which can be used as a feedback to check the result of each training cycle.

An exemplary training procedure of a typical back propagation neural network may be summarized as follows.

(1) Start by initializing the input weights for all neurons. The initialization may use random numbers between 0 and 1.
(2) Apply input to the network.
(3) Calculate the output.
(4) Compare the resulting output with the desired output (based on the training data) for the given input. The discrepancy is referred to as error.
(5) Modify the weights and threshold for all neurons based on the error.
(6) Repeat the process until the error reaches an acceptable value (e.g. error <2%), indicating that the neural network has been trained successfully. If the training reaches a maximum count of iterations without achieving an acceptable error level, the training may be considered unsuccessful.

The challenge of backward propagation neural network printing is to find a good algorithm for updating the weights and thresholds in each iteration (the above step (5)) to minimize the error. The weights and threshold for neurons in the output layer and that of hidden layers are usually updated separately as they may involve different calculations. Generally, during a training iteration of a back propagation neural network, the training algorithm starts modifying the weights at the output layer, and then proceeds backwards on the hidden layers one by one until reaching the input layer.

The detail of the training iteration of a back propagation neural network will be further illustrated using embodiments such as RankNet and LambdaRank below. The detailed design of RankNet and LambdaRank algorithm are disclosed in Chris Burges, et al., Learning to Rank using Gradient Descent, ICML, Pages: 89-96, 2005 (RankNet); and in Christopher J. C. Burges, Ranking as Learning Structured Outputs, Proceeding of NIPS2005, Workshop on Learning to Rank, Pages: 7-11, December 2005 (LambdaRank).

Pair-wise BP Neural Network Algorithms

Given training data: $N_q$ queries $\{q_i|i=1, \ldots, N_q\}$; $N_{di}$ documents $\{d_{ij}|j=1, \ldots, N_{di}\}$ for each query $q_i$, where $\Sigma_{i=1}^{N_q} N_i = N_{doc}$; $N_f$ features $\{f_k(d_{ij})|j=1, \ldots, N_f\}$ for each document $d_{ij}$. $N_{pair}$ pairs $(d_{ij1}, d_{ij2})$ generated by ground truth rating $\{R(q_i, d_{ij})\}$ or $\{R_j^i\}$.

Initialize: Initialize the weights over all edges of the neural network. The topology of the neural network defines the number of input (features), number of layers and number of hidden nodes in each hidden layer. Take a 2-layer NN as an example.

Calculate:
1. Do for epoch=1, 2, ..., T
2. Do for query=1, 2, ..., $N_q$
3. Do for every pair of documents in this query
4. Forward propagate for document pair $(d_n, d_m)$
5. Calculate the cost using cost function: $Cost(d_m, d_n) = f(O_m, O_n)$
6: Back propagate using the gradient calculated from Cost $(d_m, d_n)$
7: End for;
8: End for;
9: End for;

Query-wise BP Neural Network Algorithms

The given training data and initialization are the same as above.

Calculate:
1. Do for epoch=1, 2, ..., T
2. Do for query=1, 2, ..., $N_q$
3. Forward propagate: calculate the outputs $\{O_n, O_{n+1}, \ldots, O_m\}$ of NN for each document in the query
4. Calculate the cost using a cost function over all documents of this query: $Cost(q) = f(O_n, O_{n+1}, \ldots, O_m)$
5: Back propagate using the gradient calculated from Cost (q)
6: End for;
7: End for;

LambdaRank Algorithm

An exemplary training algorithm of a neural network based on LambaRank algorithm is illustrated below using a 2-layer neural network including an input layer (layer 0), a hidden layer (layer 1) and an output layer (layer 2).

Given training data: $N_q$ queries $\{q_i|i=1, \ldots, N_q\}$; $N_d^i$ documents $\{d_j^i|j=1, \ldots, N_d^i\}$ for each query $q_i$, where $\Sigma_{i=1}^{N_q} N_i = N_{doc}$; $N_f$ features $\{f_k(d_j^i)|j=1, \ldots, N_f\}$ for each document $d_j^i$; and $N_{pair}$ pairs $(d_{j1}^i, d_{j2}^i)$ generated by ground truth rating $\{R(q_i, d_j^i)\}$ or $\{R_j^i\}$.

Initialize: 2-layer Neural Network (including one hidden layer and an output layer, in addition to the input layer) with $N_f$ input nodes, $N_h$ hidden nodes and 1 output nodes. Initialize hidden node weight $w_{ij}$ (assigned to input j on layer i) with random numbers. Initialize hidden node thresholds to 0s.

Each feature corresponds to an input node. The training starts with a given feature set, which can be any usable set of relevant features, but is preferably a feature set carefully selected using a feature selection method or algorithm.

Calculate: The following is an exemplary pseudocode for the training procedure of the LambaRank algorithm.
1: Do for epoch=1, ... T
2: Do for query=1, ..., $N_q$
3: Forward Propagation:
4: For every document n in this query, calculate output $$O_n = \sum_{i=0}^{N_h} w_{2i} \tanh\left(\sum_{j=0}^{N_f} w_{ij} f_j^n + threshold_i\right),$$

where tan h( ) is the hyperbolic tangent function.
5: Lambda Calculation:

$$Lambda(n) = \sum_{\{m:r(m)<r(n)\}} \frac{2}{1+e^{-2(O_m-O_n)}} \times \left|\frac{(G_{r(n)} - G_{r(m)}) \times (DG_{Rank(n)} - DG_{Rank(m)})}{MaxDCG}\right| - \sum_{\{m:r(m)>r(n)\}} \frac{2}{1+e^{-2(O_n-O_m)}} \times \left|\frac{(G_{r(m)} - G_{r(n)}) \times (DG_{Rank(m)} - DG_{Rank(n)})}{MaxDCG}\right|,$$

where r(n) is the ground-truth rating of document n, and Rank(n) is the ranking position (given by the ground-truth ratings) of document n in this query. G, DG and MaxDCG are calculated as described in K. Jarvelin and J. Kekalainen, IR Evaluation Methods for Retrieving Highly Relevant Documents, In SIGIR 23, pages 41-48, 2000.

6: Backward Propagation:
Update the threshold:

$$threshold_i^{(0)} = threshold_i^{(0)} + LearningRate * W_{1i}^{(1)} * \sum_{k=0}^{DocNum-1} (lambda(k) * [(1 - (O_{ik}^{(0)})^2])$$

Update the hidden node weight:

$$W_{ij}^{(0)} = W_{ij}^{(0)} + LearningRate * W_{1i}^{(1)} * \sum_{k=0}^{DocNum-1} (lambda(k) * [(1 - (O_{ik}^{(0)})^2] * Input(k, j)),$$

Update the output node weight:

$$W_{1i}^{(1)} = W_{1i}^{(1)} + LearningRate * \sum_{k=0}^{DocNum-1} (lambda(k) * O_{ik}^{(0)}),$$

Where LearningRate could be fixed or changed after every epoch.

7: End for;
8: End for;
Output: neural network models, including the weights and thresholds of the initialized neural network The above description of the LambaRank algorithm uses the following notations:

$W_{ij}^{(0)}$: i is the hidden node index, j is the feature index, and (0) is the layer index of the input layer.

$W_{1i}^{(1)}$: i is the hidden node index, and (1) is the layer index of the hidden layer.

$O_{ik}^{(0)}$: i is the hidden node index, k is the document index, and (0) is the layer index of the input layer.

Input(k,j): k is the document index, and j is the feature index.

Exemplary FPGA Implementation of LambaRank

In one embodiment, the above-described LambaRank neural network training algorithm is implemented using FPGA. The implementation is at least partially hardware-based using customer-configured a field programmable gate array. A unique data streaming method is used between a host computing device and the FPGA board to enable training of a large data set.

A streaming architecture is used to address the challenges faced by a Web ranking neural network algorithm such as LambaRank. The core concept of this design is to create a high bandwidth processing engine that can consume training data in a continuous order. Given the training data from host computer, a series of operations are performed in multiple computation units (or processing elements) in the processing engine. This design exploits the parallelism without explicitly managing allocation, synchronization, or communication among the computation units. These computation units may be carefully to enable the pipelined, high-bandwidth processing of the training data.

Figure 4:
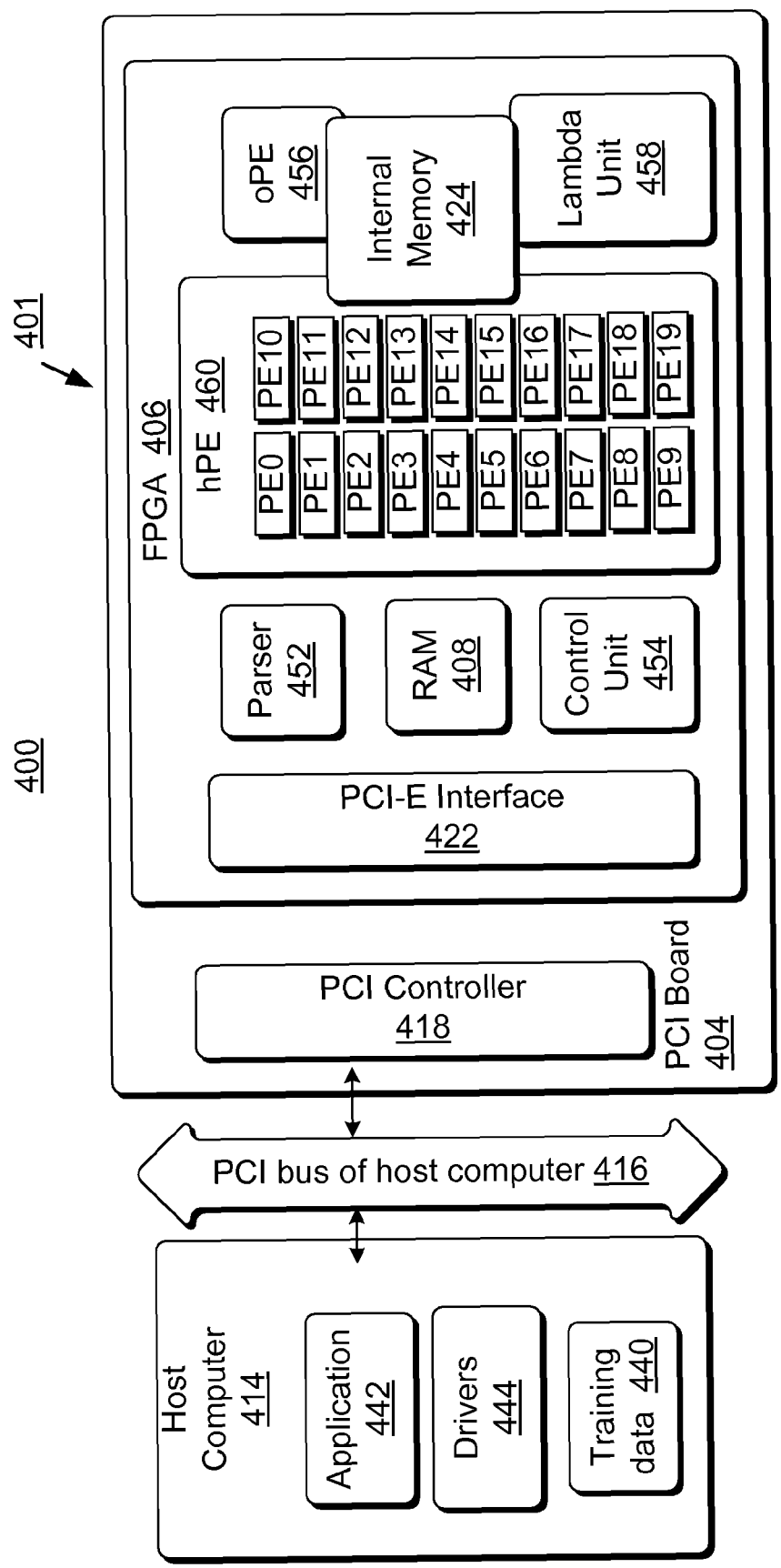
FIG. 4 shows an exemplary architecture of an FPGA-based accelerator system that is operable to implement a LambaRank algorithm for relevance-ranking.

FIG. 4 is a block diagram showing the architecture of an accelerator system 400 that is operable to implement a LambaRank algorithm for relevance-ranking. The accelerator system 400 is based on the accelerator system 100 of FIG. 1, but has certain design aspects and components that are suited for LambaRank algorithm.

The accelerator system 400 includes an FPGA device 401 and a host computer 414 operatively in connection with each other. The FPGA device 401 has an FPGA 406 residing on a substrate, such as a PCI card 405. The FPGA board 406 is designed for a single PC with PCI interface connected to the host computer 414. One embodiment of the FPGA device 401 is a PCI card plugged in the host computer 414. The FPGA 406 has an onboard memory 408. Through a PCI interface 422, the PCI board 404 may interface with a PCI bus 416 on or associated with the host computer 414. The PCI board 404, and/or devices thereon, may communicate with the bus 416 thorough a PCI controller 418. The computation logic blocks of FPGA 406 are programmed to comprise a hidden layer processing engine hPE 460 and the output layer processing engine oPE 456. Each engine is configured to perform computation associated with the respective layer of the LambaRank algorithm being implemented, hidden layer by hPE 460 and the output layer by oPE 456, respectively. The hidden layer processing engine hPE 460 has a plurality of processing elements PE0-PE19, each representing a hidden node of the hidden layer. The illustrated hPE 460 has twenty processing elements. Although the number of the processing elements is flexible in principle, the choice may have an impact on the performance, complexity and cost of the FPGA accelerator 401. As will be shown, processing elements PE0-PE 19 can each be arithmetic logic unit (ALU) in some embodiments.

The FPGA 406 further has an internal memory 424 directly accessible by the processing engines such as hPE 460 and oPE 456.

The FPGA 406 further has a lambda unit 458 to perform computation associated with the calculation of lambda in the LambaRank algorithm. The lambda unit 458 may also have direct access to the internal memory 424. The FPGA 406, including the process engines hPE 460, oPE 456 and the lambda unit 458, is controlled by a control unit 454. The data communicated from the host computer 414 through PCI interface 422 is parsed by the parser 452.

One suitable commercial example that can be configured as FPGA 406 is Altera Stratix-II FPGA, which has logic array blocks (LABs) that can be programmed as processing elements, and memory block structures (such as M512 RAM, M4K RAM, and M-RAM blocks) that can be used as the internal memory as described herein. Altera Stratix-II FPGAs further support various high-speed external memory interfaces, including double data rate (DDR) SDRAM and DDR2 SDRAM, RLDRAM II, quad data rate (QDR) II SRAM, and single data rate (SDR) SDRAM.

The PCI controller 418 may either be an integral part of the FPGA 406 or a separate chip but placed on the same PCI board 404 together with the FPGA 406. One suitable commercial example for the PCI controller 418 is Xilinx Virtex5, which is a PCIe interface chip.

Figure 5:
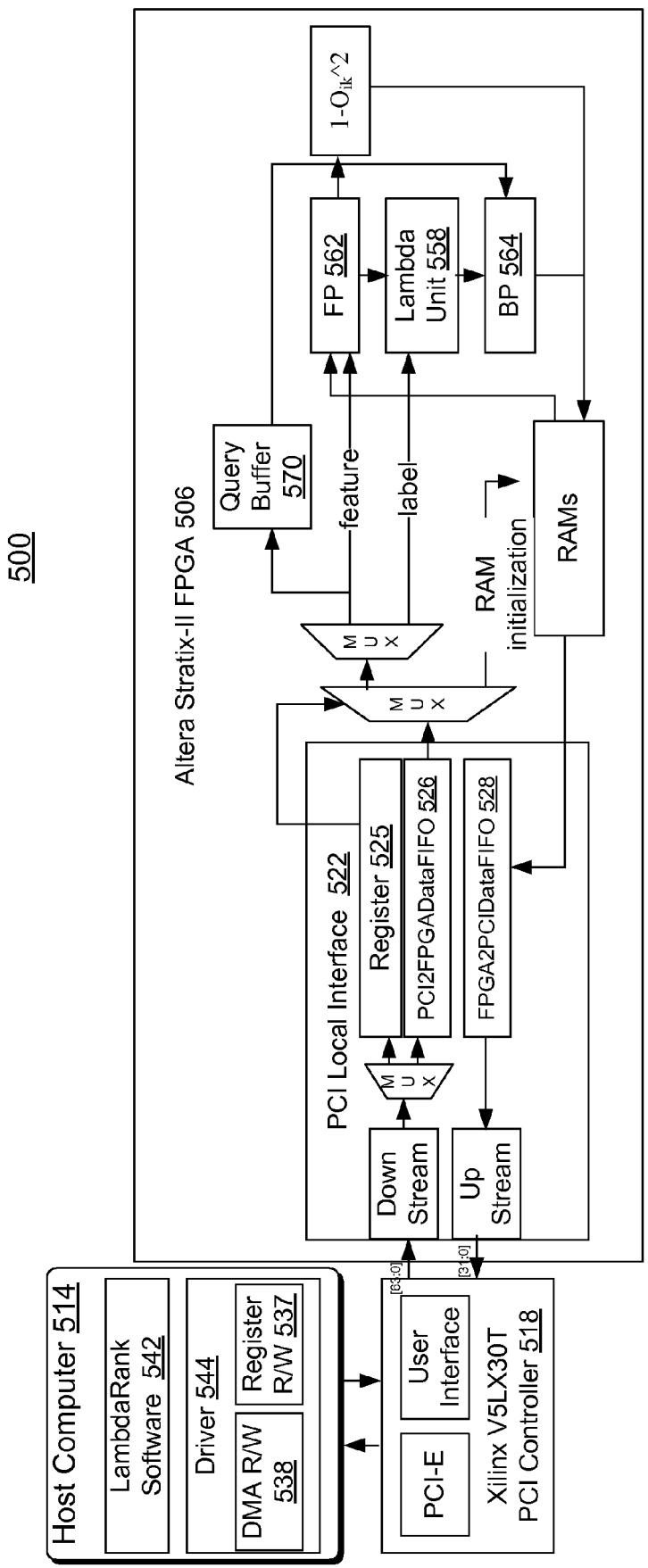
FIG. 5 shows an exemplary hardware-related LambaRank implementation using an FPGA accelerator system.

FIG. 5 is a block diagram showing a hardware-related LambaRank implementation using an accelerator system 500. FIG. 5 may be seen as a different representation of the accelerator system 400 showing certain process details but omitting some others. Particularly, the processing engines hPE 460 and oPE 456 in FIG. 4 are represented in FIG. 5 by their functional blocks FP 562 and BP 564 for the computations associated with forward propagation and backward propagation, respectively, in the LambaRank algorithm.

FPGA 506 operatively implements LambaRank Web relevance training algorithm. LambaRank software 542 is installed on the host computer 514, but at least part of the LambaRank training computation is implemented on and carried out by the FPGA 506. The LambaRank software 542 may have, or be associated with, a driver 544 having a register read/write (R/W) module 538 and/or a direct memory access read/write (DMA R/W) module 537 for operation of the LambaRank software 542 with the CPU, memory and storage of the host computer 514 through a PCI controller 518.

The FPGA 506 may include a PCI local interface 524 for interfacing between the PCI controller 518 and the processing units of the FPGA 506, e.g., FP 562, lambda unit 558 and BP 564. The PCI local interface 524 provides a downstream channel to stream data from the host computer 514 to the processing units FP 562, lambda unit 558 and BP 564 of the FPGA 506, and an upstream channel to send data from the processing units of the FPGA 506 to the host computer 514. The downstream channel users a register 525 as a placeholder for the stream data for data delays and shifts, and an FIFO 526 for PCI-to-FPGA data transmission. The upstream channel has an FIFO 528 for FPGA-to-PCI data transmission. Through the PCI local interface 522, the stream data including the feature data is sent to the forward propagation unit FP 562 to perform forward propagation calculations. At the same time, for each query, at least some data are temporarily stored in a query buffer 570 to be subsequently used by the backward propagation unit BP 564 to perform backward propagation calculations. This provides direct access of such data by the backward propagation unit BP 564 such that it does not have to request the same data from the host computer 514. Label data (such as ratings of the documents in the training data) are sent to the lambda unit 558 to perform lambda calculation.

The processing units FP 562, BP 564 and the lambda unit 558 implement the computation logic. As shown in FIG. 4, these processing units may comprise multiple processing engines (hPE 460 and oPE 456) and/or processing elements (PE0-PE19). The FPGA 506 may also have a memory management unit (MMU) for aligning or managing data for faster processing. The processing units of the FPGA 506 return an output to the PCI local interface 522 for further implementation or other use.

Figure 6:
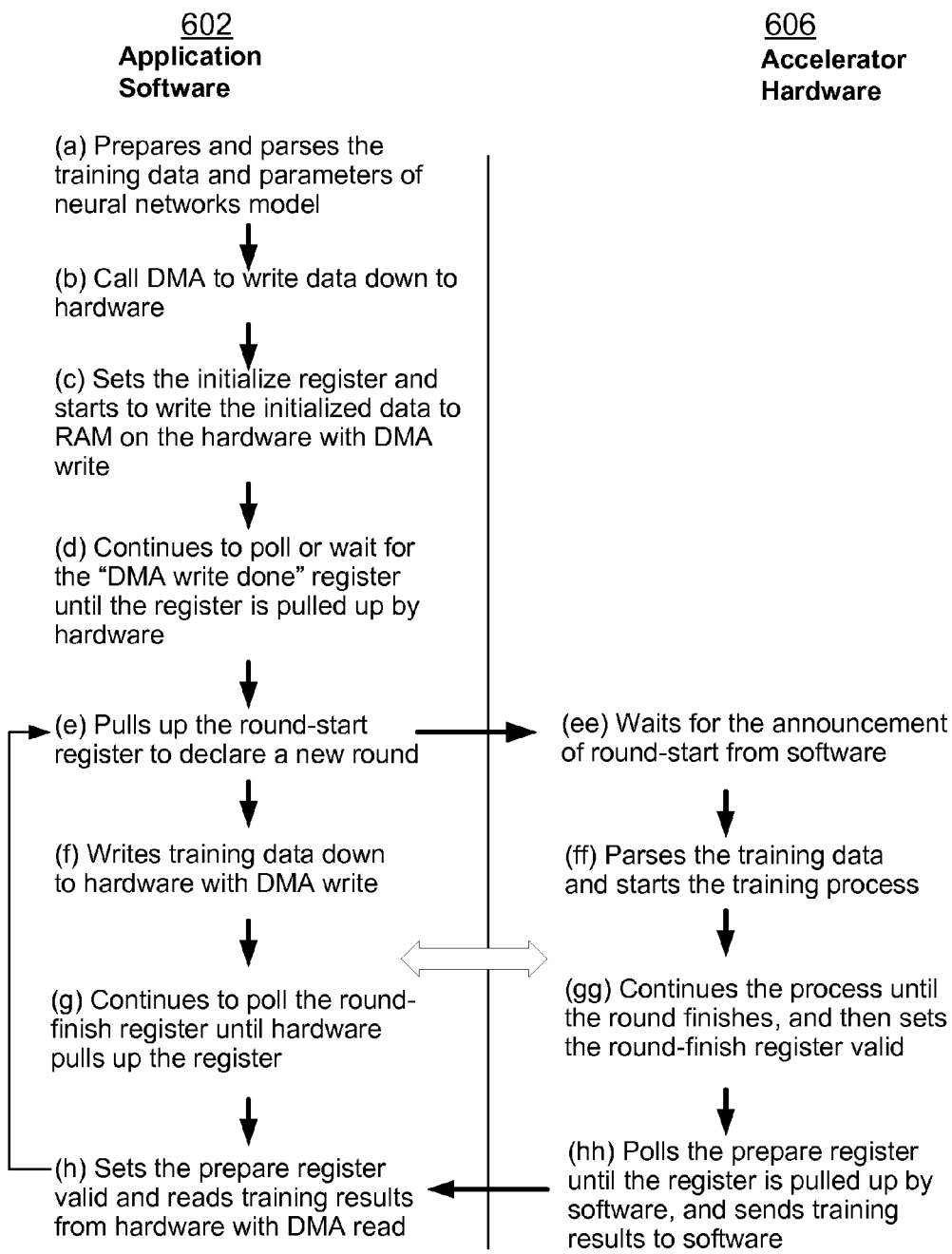
FIG. 6 shows an exemplary workflow for using an FPGA accelerator such as shown in FIGS. 4-5 to train a neural network.

FIG. 6 illustrates an exemplary workflow 600 for using an FPGA accelerator such as shown in FIGS. 4-5 to train a neural network. The workflow 600 shows the actions taken by or occurring in software and hardware in the training processing, as well as the alternation therebetween. The first column 602 represents actions taken by the application software installed on a host computer such as 514. The second column 606 describes actions performed on, or by, hardware, such as accelerator device 401. In the following, steps (a)-(h) and (ee)-(hh) are steps for training a neural network algorithm such as LambaRank.

At (a), the application software prepares and parses the training data and parameters of neural networks model stored on the host computer. The possible data processing at this point may include organizing the data in the sequence of how the FPGA logic will access and utilize it. At (b), application software calls the write routine in the driver installed on the host computer to write the data to memories on the FPGA accelerator. The write routine may be implemented with a direct memory access (DMA) method to achieve high bandwidth access to the accelerator. At (c), the software sends instructions to set the initialize register (a register for initialization) and starts to write the initialized data onto the accelerator hardware with the DMA write. At (d), the software continues to poll or wait for the "DMA write done" register (a register to indicate the status of "DMA write done") until the register is pulled up by hardware. At (e), the software pulls up the round-start register to declare a new round.

After this point, the actions on the application software side and the actions on the accelerator hardware side take place interactively. At (ee), the hardware waits for the announcement of a round-start from the software. Meanwhile, at (f), the software writes training data onto the hardware with DMA write. At least some of the training data is written directly to an internal memory (such as internal memory 424) directly accessible by the FPGA computation logic blocks such as processing units or processing engines. At (ff), the hardware parses the training data written by the DMA write and starts the training process. At (gg), the hardware continues the training process until the round finishes, and then sets the round-finish register valid. At (g), the software continues to poll the round-finish register until hardware pulls up the register. At (h), the software sets the prepare register (a register indicating a status of training result preparation) valid and reads training results from hardware with DMA read. At (hh), the hardware polls the prepare register until the register is pulled up by software, and then sends training results to the software. The training results may be intermediate data or final results.

In the training process, drivers (e.g., 444 and 544) installed on the host computer also runs driver routines to facilitate the communication between the application software and the accelerator hardware. The operations of the driver may mainly include register write, register read, DMA write and DMA read. Register access (write/raad) is used to communicate status and control signals between the software and the hardware. DMA engine could write/read large number of data without bringing heavy load to CPU. Software uses DMA write routines to write initialized data and feature data to memories in hardware. At the end of each round of the training process, DMA read is used to read back results from hardware.

Data Flow and Data Format

In lambda rank algorithm, the target is to find the optimal weights and thresholds for the neural networks in order to construct an efficient computation model for purposes such as Web ranking. A straightforward exemplary data flow is shown below:

Algorithm: LambdaRank
Initialize: initial Weight RAM and Threshold RAM
Do for t=1, 2, . . . N query
(1) Perform Forward Process (FP 562)
(2) Perform Lambda Calculation (lambda unit 558)
(3) Perform Backward Propagation (BP 564)
Output: the updated weights and thresholds of the neural networks.

To enable the data streaming mode access by the FPGA 506 (or FPGA 406), an exemplary data format as shown in FIG. 7 is used.

FIG. 7 shows an exemplary data format used for data streaming from a host computer (e.g., 514) to an FPGA (e.g., 506). The data format 700 represents a data stream in which each row represents a data row containing eight bytes (64 bits of data) arriving at the same time. In the illustrated example, all data is 64-bit aligned, and the blank parts are complemented by zeros. Any other size of the data row may be used, depending on the hardware characteristics. In each data block, some bytes are combined to contain the same data entry. Multiple data rows provide a data block for a query, and such multi-row data blocks arriving sequentially representing one query at a time. For example, data format 600 illustrates two data blocks, one for query 0 and the other for query 1. In the training, the data block for query 2 (not shown) follows the data block of query 1, and so on.

Further detail of the data format is explained using the data block of query 0. In each row, the data is filled from the right to the left. It is shown that the first row contains eight bytes, of which the first two bytes (the two bytes to the right in the first row) are combined to contain digits that represent the total number of documents in the training data for the present query (query 0); next two bytes are combined to contain digits that represent the total number of pairs of documents in the training data for the present query (query 0); and the next four bytes blank bytes (or fixed number of bytes). In the illustrated example, the total number of documents is four, mainly Doc 0, Doc 1, Doc 2 and Doc 4. In an actual web ranking training data set, the total number of documents in each query tends to be much greater.

The next two rows (the second and the third rows) of data contain data for indexes of the document pairs that are ranked together in relation to each other. Not all possible document pairs are used in the training in every query. Only those that are relevant are specified in these pair index rows. Every two bytes defining the identification of a specific pair, with the first byte defining the higher index (Index (H)) of the pair and the second byte defining the lower index of the pair (Index (L)). In the example illustrated in data format 600, there are five relevant document pairs for query 0. Unused bytes in the pair index rows are left blank. Naturally, if a large number of document pairs require more than two rows to define, the pair index rows may include more than two rows.

The next three rows (the fourth, fifth and sixth rows) of the data contain normalized gains $$\frac{(G_{r(n)} - G_{r(m)})}{MaxDCG},$$

which can be pre-calculated from the training data and can therefore can be streamed from the host computer to the FPGA. In comparison, the terms $(DG_{Rank(n)} - DG_{Rank(m)})$ in the lambda calculation are to be calculated during the neural network learning by the FPGA. Each document pair corresponds to a normalized gain.

The rest of the rows of the data block for query 0 contain feature values of each document in the current query (query 0). In a Web ranking neural network, each document has a feature value with respect to each of the $N_f$ features. This feature value is the input value for the corresponding node of the input layer of the neural network. The data format 600 illustrates four features (features 0-3), but any number features may be used depending on the selected feature set.

The data format for the next query (query 1) and all other subsequent queries is similar and will not be repeated herein.

The streamed data contains necessary information (generated and inserted by software), with which FPGA logic can perform computing functions over the data stream without interaction with software or drivers. Furthermore, the data is organized in the sequence of how FPGA logic is accessing and utilizing it, such that input data is consumed at the time FPGA logic receives it. The FPGA may buffer the result for a delayed read from the software, which further reduces the time and processing cost of hardware/software communication.

Processing Engine Architecture

In order to maximize the acceleration of the neural network training, the FPGA logic units (processing elements) are elaborately arranged. The LambdaRank, for example, mainly include three steps: forward process (FP), lambda calculation, and backward propagation (BP), according to the algorithm described herein. In these three steps, forward process and backward propagation share many basic calculation items. For efficient usage of FPGA board resources, one embodiment combines the FP and BP in one computation unit or processing engine. Moreover, a refined structured pipeline is integrated to the computation unit.

Figure 8:
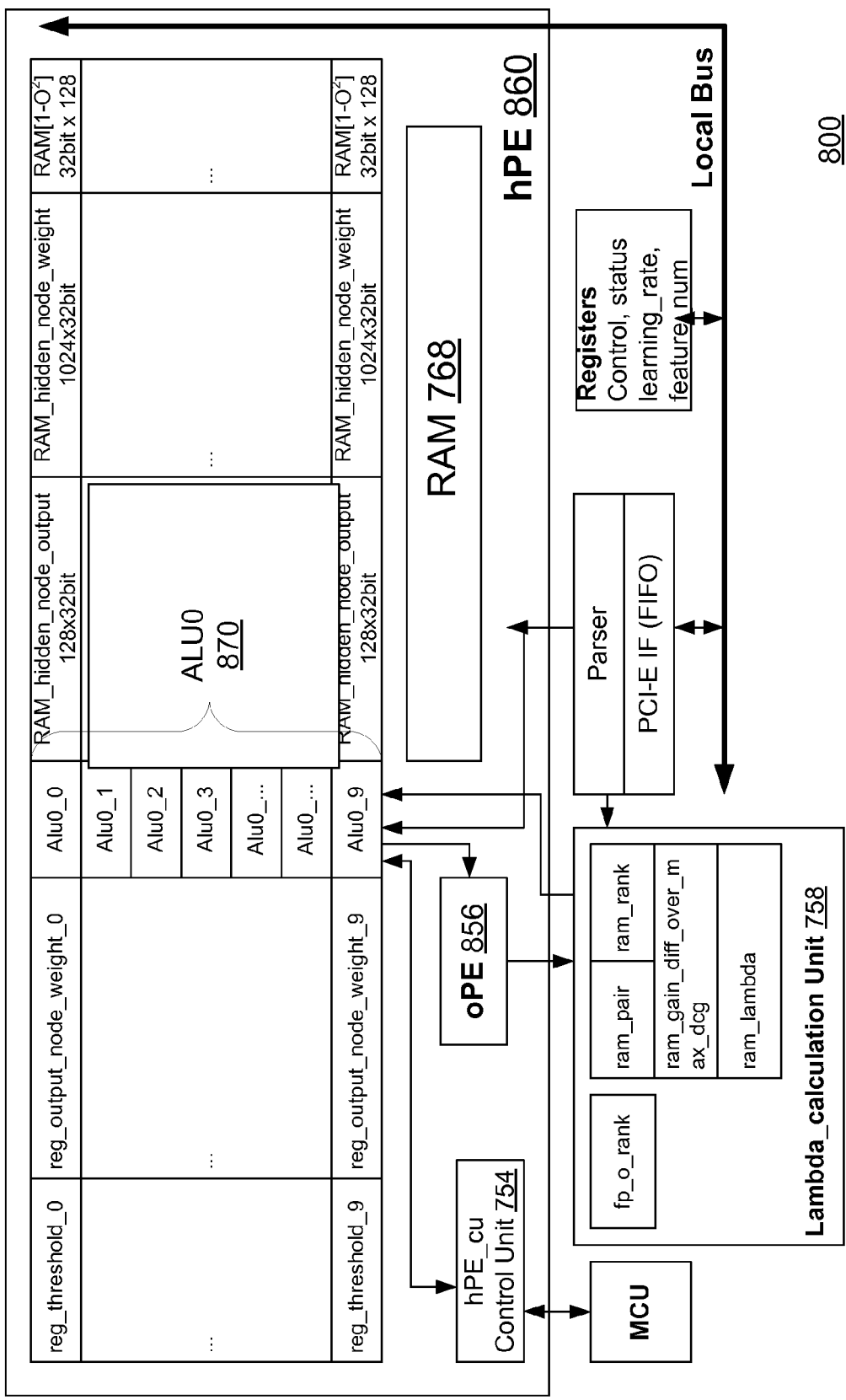
FIG. 8 shows an exemplary architecture of processing engines of an FPGA.

FIG. 8 is a diagram showing an exemplary architecture of the processing engines of the FPGA. The FPGA computation structure 800 has three main computation units, namely hidden layer processing engine hPE 860, output layer processing engine oPE 856 and lambda calculation unit 858. The data layer processing engine hPE 860 performs both FP and BP computations. Its main components are memory units RAM 868, control unit 854 and arithmetic logical units (ALU) ALU0 870. For mapping to the structure of the neural network, ALU0 870 is thought to be the hidden node layer. In the illustrated computation structure 800, the number of hidden nodes is ten, realized by Alu0_0-Alu0_9, which are all instances of ALU0. Each instance of ALU0 has access to corresponding data such as a threshold, an output node weight, an intermediate hidden node output, a hidden node weight O and the term $1-O^2$. These data are aligned with their corresponding arithmetic logic unit Alu0_0-Alu0_9 to be directly accessed the respective arithmetic logic unit Alu0_0-Alu0_9. The output node is realized by the oPE 856. These components are further illustrated below.

Figure 9:
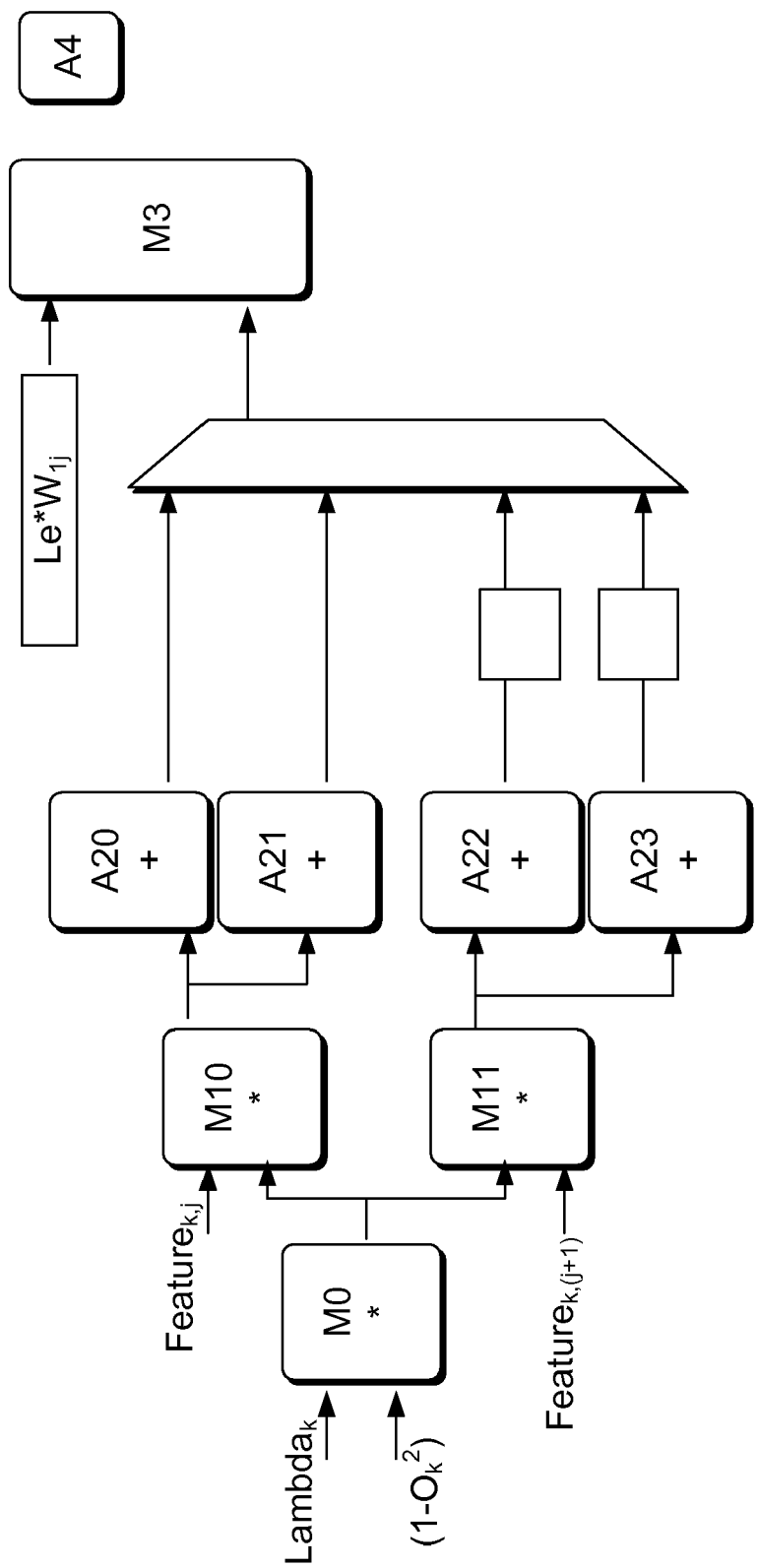
FIG. 9 shows exemplary structure of an arithmetic logic unit (ALU) in the FPGA.

FIG. 9 is a diagram showing an exemplary structure of an arithmetic logic unit (ALU) in the FPGA. The arithmetic logic unit 900 is an exemplary instance of ALU0 which accomplishes the calculations associated with the hidden nodes. These calculations are a critical part in the neural network. As shown in FIG. 9, each instance of ALU0 is an arithmetic logic unit 800 which includes several multipliers M0, M10, M11 and M3, and several accumulators (adders) A20, A21, A22, A24 and A4. The arrangement of these multipliers and accumulators are configured according to the calculations associated with the hidden nodes of the neural network algorithm. The illustrated instance of ALU0 (800) is particularly designed for LambaRank. In one embodiment, each multiplier is a 3-pipeline floating point multiplier, and accumulator a 3-pipeline floating point accumulator. The detail of these 3-pipeline floating point multipliers and accumulators will be illustrated in a later section of this disclosure.

The ALU0, including its instances (such as arithmetic logic unit 900), is designed for FP and BP elaborately. The sequential processing relation is designed to be able to reuse calculation resources. In addition, a two-step arrangement is made for the pipeline. The relations between operating codes and the stages of pipeline can be seen in FIG. 9.

Forward propagation is implemented by the hidden node layer and the output node layer which consist of nodes having calculation abilities. As described earlier, ALU0 including its Alu0 instances constitutes the hidden node layer processing engine hPE, while the output processing engine oPE is the output node layer which has only one node. For every instance of ALU0, alu0_opcode generated by hPE_cu controls the status of the respective calculators. The oPE mainly realizes tanh and multiplier_accumulator functions in order to calculate the output O of the LambaRank neural network. Tanh function is referred in the implementation of sigmoid function, the detail of which will be shown later.

The basic structure of backward propagation is similar to or the same as ALU0 in the forward propagation. Although hPE_cu will make some differences in the alu0_opcode and the status of the calculators of backward propagation as compared to the forward propagation, the calculation process of backward propagation is closely associated with the hidden node layer. The sequential processes of the backward propagation and the forward propagation are thus combined for reusing of computing resources based on this commonality.

Lambda Calculation Architecture

Lambda calculation is the computation unit for calculating the critical parameter LAMBDA. This is the second step in LambaRank algorithm.

Figure 10:
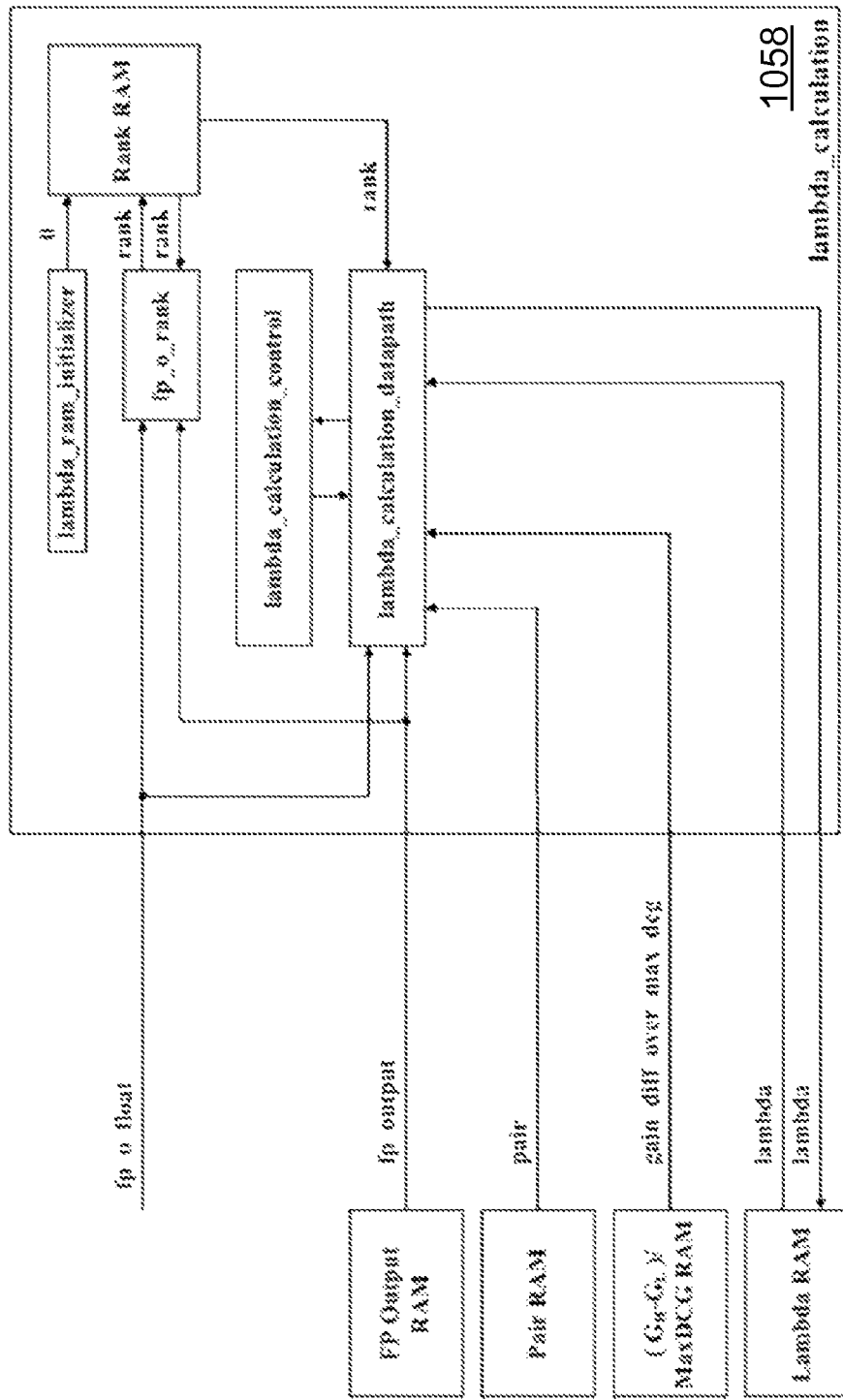
FIG. 10 shows an exemplary structure of processing modules in the lambda calculation unit.

FIG. 10 shows an exemplary structure of processing modules in the lambda calculation unit. FP passes the results to the lambda calculation unit 1058. The lambda calculation unit 1058 puts the lambda values in the memory for BP. In the lambda calculation unit 1058, fp_o_rank ranks the FP results and stores them in the Rank RAM, which may be part of the internal memory of the FPGA. Under the control of lambda_calculation_control module, Lambda_calculation_datapath directs the data flow and calculation processing.

Data Organization

The accelerator system supports hierarchical memory organization and access methods using SDRAM, SRAM and RAM/registers within the FPGA.

According to one example, training data that will be iteratively used is streamed to an FPGA accelerator device, such as FPGA 106. The streamed training data may be organized according to its access order in logic associated with the FPGA so that the FPGA can fetch data in a so-called, and well-known, "burst" mode, thus enabling high bandwidth access to the data set.

Temporary data structures, such as intermediate variables, parameters, and so forth, and results, e.g., the learned model, could be stored in the onboard memory (such as the onboard memory 108) or registers inside the FPGA, which would act as high bandwidth, low latency cache. The data could be utilized without needing to access memory off of the FPGA, which would enhance the access speed of the cache.

Data Compression/Decompression

A bit-map based data compression/decompression method for the architecture may be implemented to increase memory capacity and bandwidth available in the accelerator system. Training data may be compressed by conventional compression software and stored in the memories associated with the acceleration device. The FPGA may then read and decompress the data before performing computations.

Implementation of Sigmoid

One embodiment has an efficient approximation of the sigmoid function implemented in the FPGA-based reprogrammable hardware-based artificial neural networks. The sigmoid part of the FPGA realizes the function sigmoid(x) $=1/(1+\exp(-x))$, where x is the input. This module is consisted of a fixed-point number sigmoid function and an interpolation module. An exemplary implementation of the sigmoid function is disclosed in an article by M. T. Tommiskal, "Efficient Digital Implementation of the Sigmoid Function for Reprogrammable Logic", IEE Proceedings— Computers and Digital Techniques, November 2003, Volume 150, Issue 6, p. 403-411. The interpolation part is a linear interpolation and coded for the specification fixed point numbers which are output from the sigmoid function. The interpolation is a linear interpolation which gives the final result from to the nearest two sigmoid values.

The core of this module is implemented by combinational circuit. The input data is a 3.3 fixed-point number. The output signal is 7-bit fraction and the integer part is assumed to be 0. The combinational (And_Plane) and sequential (Or_Plane) logic equations come from the table of the above referenced paper.

Floating Point Library

In the FPGA-based board, the referred floating point calculators mainly point to the adder and multiplier. For a clear conception, the adder is referred to with the name AddSubFloat32P3 because the adder could add/sub floating point number and has three-stage pipeline. The multiplier is called MulFloat32P3 for the same reason.

Adders

The automatically generated adder by tools provided by hardware component manufacturers (e.g., Altera's IP core) may not satisfy the requirements of certain neural network algorithms, such as LambaRank. The pipeline depth of seven or eight is found to be too deep to improve the efficiency of resources. Accordingly, some embodiments of the disclosed FPGA use three-stage adders with a similar frequency performance to short the pipeline. The implementation of the AddSubFloat32P3 module may be restricted with IEEE 754.

Figure 11:
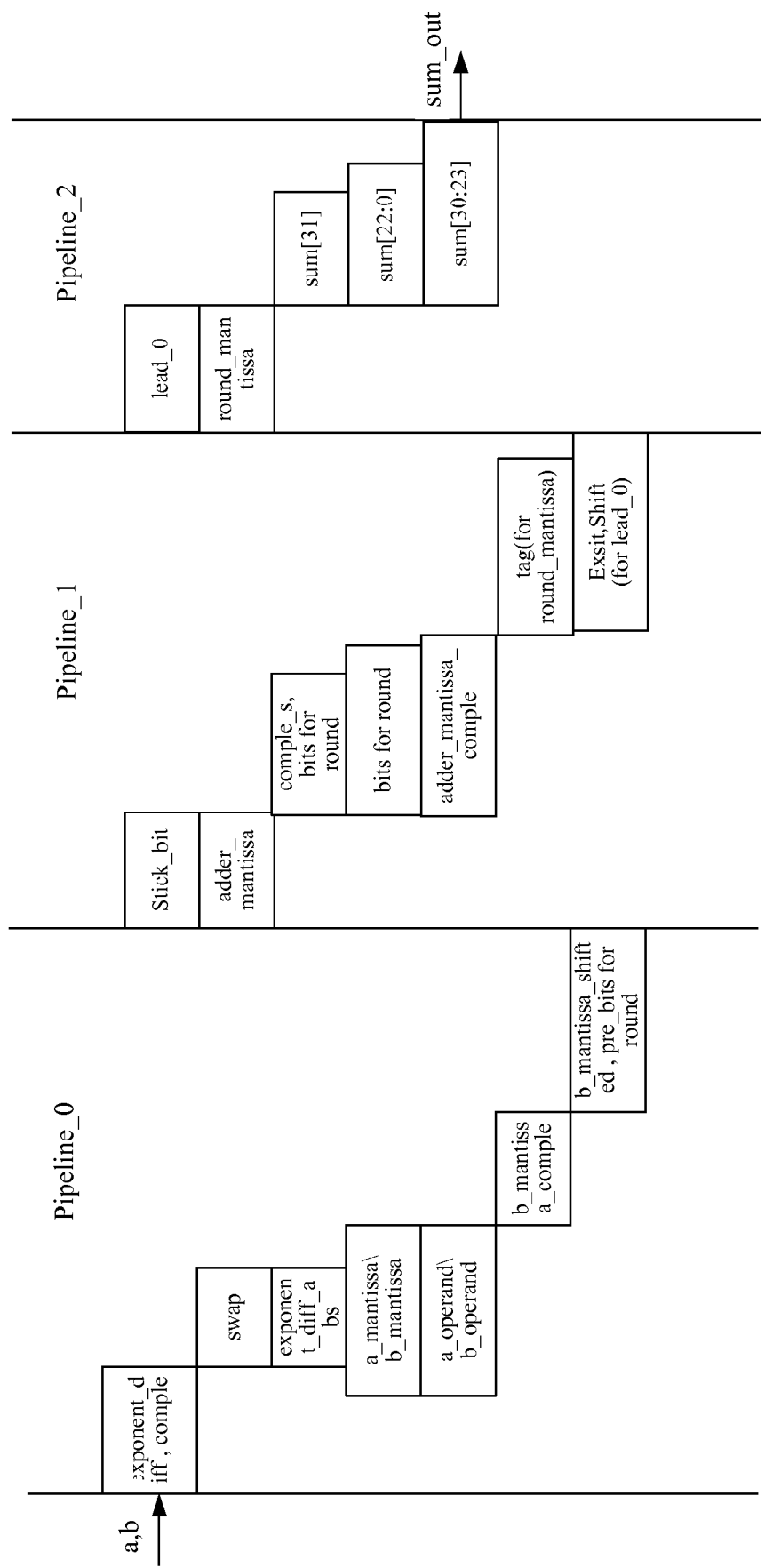
FIG. 11 illustrates an exemplary pipeline division in each processing unit such as an arithmetic logic unit.

FIG. 11 illustrates an exemplary pipeline division in each processing unit such as an arithmetic logic unit. Illustrated in FIG. 11 is an exemplary three-pipeline (three-stage) adder used in arithmetic logic units of the FPGA. The first stage (Pipeline_0) sets up or prepares the shifted operands. The module obtains the difference signs of two operands, puts the input number with smaller exponent as the second operand, shifts the second operand, and changes it to 2's complement if signs are different. The second stage (Pipeline_1) adds up the two operands and prepares for calculating the leading-zero and rounding. The last stage (Pipeline_2) calculates the rounding result and constructs the three parts of the number (sign, exponent and mantissa) as an IEEE 754 floating point and outputs the result as sum_out.

The logic of the above second stage (Pipeline_1) is complex. It not only obtains the adder result of the shifted operands, but also prepares data for the next stage. The direct adding result needs to be changed to the real adder result. In other words, if the signs of operands are different, the adding result should change to its 2's complement; and if the signs are same, the adder result is the adding result. In practice, the first stage (Pipeline_0) has already got the guard bit, round bit and stick bit. After getting adder result, these three special bits are changed to a new guard bit, round bit and sticky bit. Exemplary rules can be derived from IEEE 754. At the same time, the adder result needs to be sent to the task part which calculates the number of leading-zero in it.

At the last stage (Pipeline_2), the rounding mantissa and the number of leading-zero in the adder result are both obtained. The three parts of the final result are then constructed according to the calculation rules.

Multipliers

The automatically generated multiplier by the tools provided by the component manufacturers (e.g., Altera's IP core) may not satisfy the requirements of some embodiments. The pipeline depth of five or six is found to be too deep to improve the efficiency of resources. Accordingly, some embodiments use a three-stage multiplier with a similar frequency performance to short the pipeline. The implementation of the multiplier MulFloat32P3 module is also restricted with IEEE 754 standard.

In an exemplary multiplier module, the calculation process is divided into three stages. The first stage divides two operands into three parts, preparing the exponent of the result. The second stage multiplies two operands and gets the mantissa for rounding. The last pipe calculates the rounding result and constructs three parts of the result (sign, exponent and mantissa) as an IEEE 754 floating point.

Performance

An exemplary model for measuring the performance of LambdaRank accelerator training is provided below. The exemplary performance model can be expressed as:

$$t_{total}=t_{ini}+N_{round}*t_{round}$$

Where the initialization time $t_{ini}$ and per training round time $t_{round}$ are dependent on the implementation. The initialization time $t_{ini}$ is relatively small in the hardware or software implementations compared with the training process. The main focus of the performance is thus on the modeling of the executing time of each training round.

For the executing time of the hardware and software implementation, in every round, the time of the training process could be calculated using the time used for training one query multiplied by the number of the queries directly. The processing time for a query can be divided into three parts as described herein, forward process (forward propagation), lambda calculation and backward propagation. Here, the forward process refers to the typical multiply-and-accumulate calculations for every feature in the neural networks. The processing of lambda calculation is decided by the partial ordering relations of the documents. Thus the processing time could be measured by the number of pairs which appear in the partial order in the current query. Lastly, the representation of backward propagation is similar to the forward process, except it adds two additional updating processes. In summary, the execution time around is given:

$$t_{round(HW)}=N_{query}*(\alpha N_{doc}*N_f+\beta N_{doc}+\mu N_{pairs}+Y)$$

In some embodiments, such as the illustrated implementation of LambaRank algorithm, the FPGA-based accelerator significantly improves the speed of the training. For example, an exemplary accelerator system is able to speed up the LambdaRank algorithm by 15x~30x on real search engine data. The training time for a typical run is reduced from 10 hours to about 20 minutes. As a result, the accelerator system enables the developers and researchers more trials in the same amount of working time, and produces much higher quality ranking models in a cost efficient way.

It is appreciated that the potential benefits and advantages discussed herein are not to be construed as a limitation or restriction to the scope of the appended claims.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A neural network computing system comprising:
a Field Programmable Gate Array (FPGA) configured to have a hardware logic performing computations associated with a neural network training algorithm by receiving streamed data directly from a host computer device, the hardware logic including a processing element that performs computations related to a hidden layer of the neural network training algorithm, the processing element including a plurality of arithmetic logic units each representing a hidden node of the hidden layer; and
an interface for connecting the FPGA to the host computing device and receiving the streamed data.

2. The system as recited in claim 1, wherein the neural network training algorithm comprises a Web relevance ranking algorithm.

3. The system as recited in claim 2, wherein the Web relevance ranking algorithm comprises a LambdaRank algorithm.

4. The system as recited in claim 1, wherein the plurality of arithmetic logic units perform parallel computations.

5. The system as recited in claim 1, wherein the hardware logic of the FPGA includes an arithmetic logic unit performing computations related to the neural network training algorithm, the arithmetic logic unit having a plurality of multi-pipeline multipliers and a plurality of multi-pipeline adders.

6. The system as recited in claim 5, wherein at least one of the multi-pipeline multipliers and the multi-pipeline adders is based on floating-point numbers.

7. The system as recited in claim 1, wherein the hardware logic of the FPGA includes a processing element performing at least part of computations of both forward propagation and backward propagation of the neural network training algorithm.

8. The system as recited in claim 1, wherein the hardware logic of the FPGA includes a processing element for performing Lambda calculations of a LambdaRank algorithm.

9. The system as recited in claim 1, wherein the neural network training algorithm includes a plurality of input nodes each corresponding to a feature for Web relevance ranking.

10. The system as recited in claim 1, wherein the FPGA is provided on a substrate.

11. The system as recited in claim 10, wherein the substrate comprises a Peripheral Component Interface (PCI) board, PCI-X board, PCI-Express board, HyperTransport board, Universal Serial Bus (USB) board or Front-Side Bus (FSB) board.

12. The system as recited in claim 1, wherein the FPGA has a directly accessible internal memory, and at least part of the streamed data is written directly to the internal memory to be accessed by the FPGA to perform the computations associated with the neural network training.

13. The system as recited in claim 1, wherein the interface comprises a downstream channel to send the streamed data from the host computing device to the FPGA, and wherein the downstream channel has a First In First Out (FIFO) unit.

14. A neural network computing system comprising:
a host computing device for storing and processing training data;
a Field Programmable Gate Array (FPGA) provided on a substrate, and configured to have a hardware logic performing computations associated with a neural network training algorithm by receiving streamed data directly from the host computer device, the FPGA including a hidden layer processing engine that performs computation associated with a hidden layer of the neural network training algorithm, the hidden layer processing engine including a plurality of processing elements each representing a hidden node of the hidden layer; and
an interface for connecting the FPGA to the host computing device.

15. The method as recited in claim 14, wherein the neural network training algorithm comprises a LambdaRank algorithm.

16. A method for neural network training comprising:
storing and processing training data on a host computing device;
streaming the processed training data to a Field Programmable Gate Array (FPGA) configured to have a hardware logic performing computations associated with a neural network training algorithm, the hardware logic including one or more processing engines that map to individual hidden nodes of the neural network training algorithm, the one or more processing engines performing at least part of computations of both forward propagation and backward propagation of the neural network training algorithm; and enabling the FPGA to perform neural network training with respect to the streamed training data.

17. The method as recited in claim 16, wherein the neural network training algorithm comprises a Web relevance ranking algorithm.

18. The method as recited in claim 16, wherein the Web relevance ranking algorithm comprises a LambdaRank algorithm.

19. The system as recited in claim 15, wherein the FPGA further includes:

an output layer processing engine that performs computation associated with an output layer of the neural network training algorithm;

a lambda unit that performs computation associated with a calculation of lambda in the LambdaRank algorithm; and an internal memory directly accessible by the hidden layer processing engine, the output layer processing engine and the lambda unit.

\* \* \* \* \*